(12) United States Patent
Robertson

(10) Patent No.: US 12,207,151 B2
(45) Date of Patent: *Jan. 21, 2025

(54) METHODS, SYSTEMS, AND APPARATUS FOR ROUTING DATA OVER MEDIUM AND HIGH VOLTAGE POWER LINES

(71) Applicant: Crius Technology Group, Inc., Austin, TX (US)

(72) Inventor: Glenn John Robertson, Buda, TX (US)

(73) Assignee: Crius Technology Group, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/380,300

(22) Filed: Oct. 16, 2023

(65) Prior Publication Data

US 2024/0040460 A1 Feb. 1, 2024

Related U.S. Application Data

(63) Continuation of application No. 17/667,164, filed on Feb. 8, 2022, now Pat. No. 11,843,987.

(60) Provisional application No. 63/280,068, filed on Nov. 16, 2021.

(51) Int. Cl.
| | |
|---|---|
| *H04L 47/62* | (2022.01) |
| *H04B 3/54* | (2006.01) |
| *H04B 3/56* | (2006.01) |
| *H04W 28/02* | (2009.01) |
| *H04W 28/06* | (2009.01) |
| *H04W 36/22* | (2009.01) |
| *H04W 84/12* | (2009.01) |
| *H04W 84/18* | (2009.01) |

(52) U.S. Cl.
CPC ............ *H04W 36/22* (2013.01); *H04B 3/542* (2013.01); *H04B 3/544* (2013.01); *H04B 3/56* (2013.01); *H04L 47/6215* (2013.01); *H04W 28/0268* (2013.01); *H04W 28/06* (2013.01); *H04W 84/12* (2013.01); *H04W 84/18* (2013.01)

(58) Field of Classification Search
CPC ... H04B 1/40; H04B 3/00; H04B 3/54; H04B 3/56; H04B 3/542; H04B 3/544; H04B 5/00; H04B 17/00; H04L 12/26; H04L 25/00; H04L 29/06
USPC ........ 307/3, 18, 52; 375/219, 224, 257, 258, 375/295, 316
See application file for complete search history.

(56) References Cited

U.S. PATENT DOCUMENTS

| | | | |
|---|---|---|---|
| 3,735,329 A | 5/1973 | Funabashi et al. | |
| 6,549,120 B1* | 4/2003 | de Buda ................. | H04B 3/54 375/272 |
| 7,053,756 B2* | 5/2006 | Mollenkopf ........... | H04B 3/542 340/533 |
| 7,577,188 B1 | 8/2009 | Lewis | |
| 7,853,809 B2 | 12/2010 | Zhang et al. | |
| 8,341,289 B2 | 12/2012 | Hellhake et al. | |
| 9,793,952 B1 | 10/2017 | Bogdanovich | |
| 10,432,257 B2 | 10/2019 | Bogdanovich | |
| 10,483,469 B2 | 11/2019 | Bogdanovich | |
| 10,879,956 B2 | 12/2020 | Bogdanovich | |

(Continued)

*Primary Examiner* — Shawkat M Ali
(74) *Attorney, Agent, or Firm* — Pierson Ferdinand, LLP; Jeffrey R. Ambroziak

(57) ABSTRACT

This application relates generally to the field of network communications and, more particularly, to transmitting data over power lines.

15 Claims, 14 Drawing Sheets

(56) References Cited

U.S. PATENT DOCUMENTS

| | | |
|---|---|---|
| 11,843,987 B2 * | 12/2023 | Robertson .............. H04B 3/544 |
| 2004/0252643 A1 | 12/2004 | Joshi |
| 2005/0275532 A1 | 12/2005 | Ferri et al. |
| 2010/0130142 A1 | 5/2010 | Schubert |
| 2011/0320434 A1 | 12/2011 | Carston et al. |
| 2012/0173900 A1 | 7/2012 | Diab et al. |
| 2013/0057158 A1 | 3/2013 | Josefowicz et al. |
| 2013/0275174 A1 | 10/2013 | Bennett et al. |
| 2014/0040160 A1 | 2/2014 | Comito |
| 2014/0058577 A1 | 2/2014 | Erhart et al. |
| 2014/0175875 A1 | 6/2014 | Newman, Jr. et al. |
| 2014/0321295 A1 | 10/2014 | Fella, Jr. et al. |
| 2015/0212122 A1 | 7/2015 | Sobotka et al. |
| 2018/0375026 A1 | 12/2018 | Bogdanovich |
| 2019/0013470 A1 | 1/2019 | Bogdanovich |
| 2020/0028538 A1 | 1/2020 | Bogdanovich |
| 2020/0106479 A1 | 4/2020 | Bogdanovich |
| 2021/0088563 A1 | 3/2021 | Yan et al. |
| 2021/0119668 A1 | 4/2021 | Bogdanovich |

* cited by examiner

METHODS, SYSTEMS, AND APPARATUS FOR ROUTING DATA OVER MEDIUM AND HIGH VOLTAGE POWER LINES

CROSS-REFERENCE TO RELATED APPLICATION

This patent application is a continuation of U.S. patent application Ser. No. 17/667,164 filed on Feb. 8, 2022, which claims priority to U.S. Provisional Patent Application No. 63/280,068 filed on Nov. 16, 2021, entitled METHODS, SYSTEMS, AND APPARATUS FOR NETWORK COMMUNICATIONS AND OPERATION, which are incorporated by reference herein in their entireties.

BACKGROUND

This application relates generally to the field of network communications and, more particularly, to transmitting data over power lines.

SUMMARY

In accordance with one embodiment, an apparatus for relaying data via a power line comprises: a first coupling capacitor voltage transformer (CCVT) coupled to a power line bearing an alternating current power signal at a first frequency (e.g., 60 Hz) and a first data signal modulated at a second frequency, the second frequency being higher than the first frequency, the first CCVT configured to pass signals above a threshold frequency and to not pass signals below the threshold frequency, wherein the threshold frequency is higher than the first frequency and lower than the second frequency; a receiver coupled to receive the first modulated data signal from the first CCVT, the receiver configured to demodulate the first modulated data signal to produce a demodulated first data signal; a first network node of a local network coupled to receive the demodulated first data signal from the receiver; a second network node of the local network configured to receive the demodulated first data signal from the first network node; a transmitter coupled to receive the demodulated first data signal from the second network node and modulate it at the second frequency to produce a recreated first modulated data signal, and a second CCVT coupled to the power line, the second CCVT configured to pass signals above the threshold frequency and to not pass signals below the threshold frequency.

In accordance with another embodiment, a method of relaying data via a power line is disclosed comprising: receiving a first combined signal from a power line at a first location on the power line, the first combined signal comprising an alternating current power signal at a first frequency and a first data signal modulated at a second frequency, the second frequency being higher than the first frequency; frequency filtering the first combined signal to pass signals above a threshold frequency and to not pass signals below the threshold frequency, wherein the threshold frequency is higher than the first frequency and lower than the second frequency so that the first data signal is passed and the power signal is filtered out; demodulating the first data signal to produce a demodulated data signal; transmitting the demodulated data signal to a first network node of a local network; transmitting the demodulated data signal from the first network node to a second network node of the local network; modulating the demodulated data signal from the second network node at the second frequency to produce a recreated first data signal; filtering the recreated first data signal to pass signals at the second frequency and filter out signals at the first frequency; and coupling the recreated first data signal onto the power line at a second location.

In yet another embodiment, an apparatus for receiving data via a power line comprises: a coupling capacitor voltage transformer (CCVT) coupled to a power line bearing an alternating current power signal at a first frequency and a first data signal modulated at a second frequency, the second frequency being higher than the first frequency, the first CCVT configured to pass signals above a threshold frequency and to not pass signals below the threshold frequency, wherein the threshold frequency is higher than the first frequency and lower than the second frequency; a receiver coupled to receive the first data signal from the first CCVT, the receiver configured to demodulate the first data signal to produce a demodulated first data signal; and a network node of a local network coupled to receive the demodulated data from the receiver.

DETAILED DESCRIPTION OF THE DRAWINGS

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

U.S. Published Patent Application No. 2023/0051350 (patent application Ser. No. 17/398,224, entitled METHODS AND APPARATUS FOR MULTI-PATH MESH NETWORK ENCRYPTION AND KEY GENERATION) filed Aug. 10, 2021 and co-owned with the present application is incorporated herein by reference in its entirety.

With the growth of the Internet of Things, existing devices are becoming networked in order to enable the monitoring, controlling, and communicating of the devices. Lighting and lighting systems are devices that are becoming networked in order to control power, color, and brightness. Currently, the method for incorporating a control system into an existing lighting system may be carried out by running wire or cable from a control device/panel to the lighting system. The running of the wire or cable may cost $10,000 per floor and may require days to accomplish. Additionally, the control device/panel may cost between $10,000 to $15,000. With such economics, the implementation of the Internet of Things to existing lighting systems has been slow in coming.

A method, apparatus, and system for monitoring, controlling, and communicating of devices may be described. The method, apparatus, and system may use a radio communication to power line communication bridge and networking system for the monitoring, controlling, and communicating of devices such as lighting systems. This method, apparatus, and system may not require the running of wire or cable and may be deployed in hours, not days, at a fraction of the cost of existing control systems. Since the apparatus may be used with any lighting fixture or lamp brand, the apparatus may be integrated into any existing lighting system.

Figure 1:
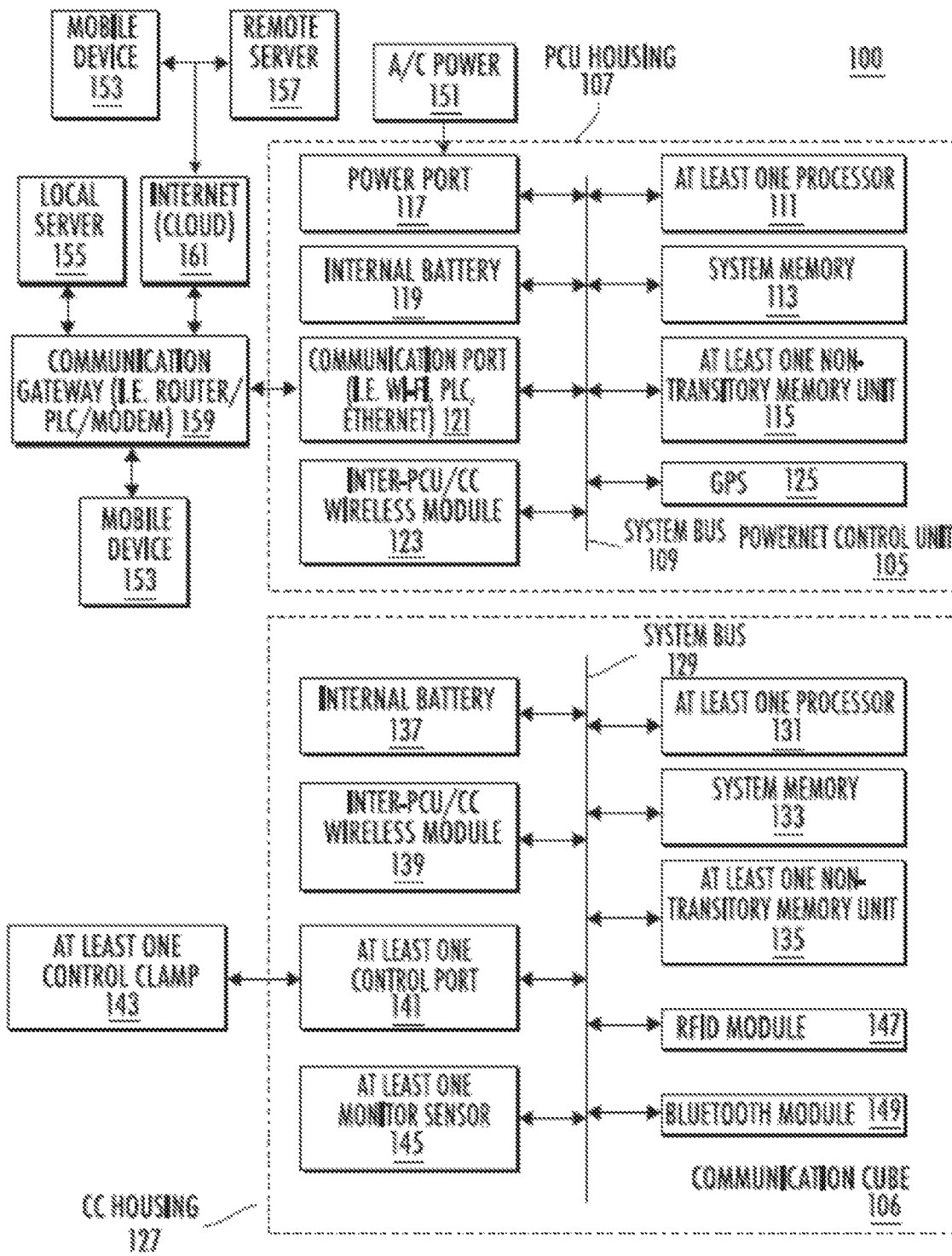
FIG. 1 is a block diagram illustrating an apparatus for monitoring, controlling, and communicating in accordance with embodiments.

FIG. 1 is a block diagram illustrating an apparatus for monitoring, controlling, and communicating in accordance with embodiments.

In embodiments, apparatus 100 may comprise at least one powernet control unit and at least one communication cube. The powernet control unit (PCU) 105 may comprise a PCU housing 107, a system bus 109, at least one processor 111, system memory 113, at least one non-transitory memory unit 115, a power port 117, an internal battery 119, a communication port 121, an inter-PCU/CC wireless module 123, and a GPS module 125, all of which may be directly or indirectly coupled to each other. The communication cube (CC) 106 may comprise a CC housing 127, a system bus 129, at least one processor 131, system memory 133, at least one non-transitory memory unit 135, an internal battery 137, an inter-PCU/CC wireless module 139, at least one control port 141, at least one control clamp 143, at least one monitor sensor 145, a RFID module 147, and a Bluetooth module 149, all of which may be directly or indirectly coupled to each other. In the installation of the apparatus, the PCU 105 may be mounted on the back of a flat electrical strike plate and may be powered by the internal battery 119 or by A/C power 151 through the power port 117 in embodiments. In embodiments, the communication port 121 may comprise at least one of a Wi-Fi radio, an Ethernet port, and a power line communication (PLC) bridge and may allow for the communication between powernet control units 105 and external control and monitoring devices such as mobile device 153, local server 155, and/or remote server 157. For Wi-Fi, PLC, and Ethernet, communication may be established through a communication gateway 159 such as a router/PLC/modem. Using a communication cube control web portal or a communication cube control app (PCU/CC dashboard application), at least one of the local servers 155 and the mobile device 153 may be used to communicate with the PCU 105 and the CC 106 through the communication gateway 159. Additionally, the communication gateway 159 may be connected to the Internet 161, thus making it possible for the remote server 157 and/or the mobile device 153, using a communication cube control web portal or a communication cube control app, to communicate with the PCU 105 and the CC 106. The PCU 105 may communicate with the CC 106 through the inter-PCU/CC wireless module 123 of the PCU 105 with the inter-PCU/CC wireless module 139 of the CC 106. The inter-PCU/CC wireless modules 123, 139 may comprise at least one of a Bluetooth radio, 6LoWPan radio, and ZigBee radio. Bluetooth, 6LoWPan, and ZigBee may encompass all past, current, and future versions of the wireless protocols. The powernet control units 105, which are connected to the PLC may be nodes, which, in turn, may be in communication with the communication cubes 106. Each PCU node may be capable of identifying the communication cubes 106 which are connected to it. This network of communication cubes 106 connected to PCU nodes which are connected via PLC may be referred to as a powernet.

In embodiments, the CC 106 may be mounted within a lighting fixture and may be powered by the internal battery 137 or by one of the at least one control clamp 143 spliced into the power line to the lighting fixture. The control clamp may be designed to splice the power line to a lighting fixture without having to shut down power to the lighting fixture or device. After splicing the power line, direct power to the lighting fixture may be removed and the CC 106 may now be capable of controlling the lighting fixture or device, thus enabling control for dimming, color, and other primary and secondary functions such as, but not limited to Li-Fi management and emergency controls. Since the control clamp 143 is tapped into the power line, the control clamp 143 may also be able to provide power to the CC 106 through the control port 141. The CC 106 may also comprise at least one monitor sensor 145 to monitor for occupancy in the area of the lighting fixture as well as the lighting fixture location and status.

In embodiments, the RFID module 147 and Bluetooth module 149 of the CC 106 may be used to establish a beacon. The RFID module 147 may be used to monitor the space around the lighting fixture or device for any RFID transmitters. In a hospital setting, the RFID transmitters may be mounted onto tables, drug carts, wheel chairs, etc. The CC 106 may then be able to keep track of the RFID transmitters in the vicinity of the lighting fixture. The Bluetooth module 149 may be used to continuously ping the area around the lighting fixture for any nearby Bluetooth enabled devices. The vast majority of phones and devices since 2006 may respond to this pinging, thus enabling the CC 106 to map and monitor the number of people that are carrying Bluetooth phones and devices that are in the vicinity of the lighting fixture. The processing of the RFID and Bluetooth monitoring may be handled locally by the at least one processor 131 of the CC 106. By having this map of people and things, if a patient is looking for a particular facility within the hospital, the path of least resistance (i.e. least congestion) for the patient to get to the particular facility may be determined from the data collected from RFID monitoring and Bluetooth pinging. This path may be transmitted to the patient who is running the hospital's mobile application on a Bluetooth enabled phone. In embodiments, the Bluetooth module 149 may be used to transmit offers, promotions, or other information to an individual with a Bluetooth enabled phone running a particular store or promotion mobile application. In such a scenario, if a customer is shopping at a grocery store and is running a store's mobile application on a Bluetooth enabled phone and the customer approaches the soft drink aisle, the CC 106 may be able to determine that the customer is in the soft drink aisle and may be able to present the customer offers and promotions for products that are also in the soft drink aisle. The CC 106 may present offers for products that are available since the CC 106 may use its RFID module 147 to detect for products labeled with RFID tags.

Figure 2:
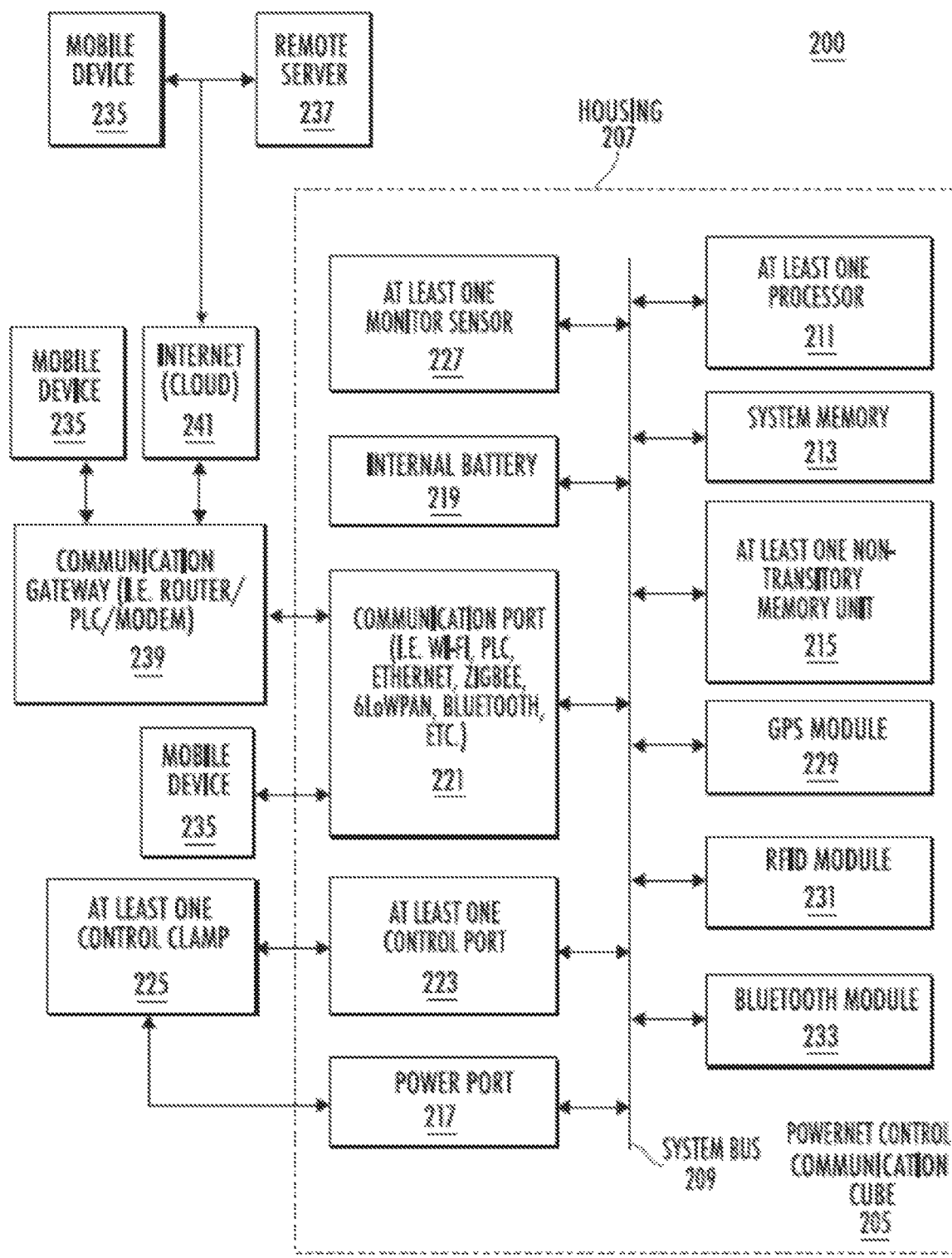
FIG. 2 is a block diagram illustrating an apparatus for monitoring, controlling, and communicating in accordance with embodiments.

FIG. 2 is a block diagram illustrating an apparatus for monitoring, controlling, and communicating in accordance with embodiments.

In embodiments, apparatus 200 may comprise at least one powernet control communication cube 205. The powernet control communication cube (PCCC) 205 may comprise a housing 207, a system bus 209, at least one processor 211, system memory 213, at least one non-transitory memory unit 215, a power port 217, an internal battery 219, a communication port 221, at least one control port 223, at least one control clamp 225, at least one monitor sensor 227, a GPS module 229, an RFID module 231, and a Bluetooth module 233, all of which may be directly or indirectly coupled to each other.

In embodiments, the PCCC 205 may be mounted within a lighting fixture or on the back of a flat electrical strike plate and may be powered by the internal battery 219 or by using one of the control clamps 225 coupled to the power port 217 to tap into a power line. Alternatively, the power port 217 may draw its power internally from one of the control clamps 225 connected to the control port 223. The communication port 221 may comprise at least one of a Wi-Fi radio, a PLC bridge, an Ethernet port, ZigBee radio, 6LoWPan radio, and a Bluetooth radio and may allow for the communication between powernet control communication cubes 205 and external control and monitoring devices such as mobile device 235 and remote server 237. Bluetooth, 6LoWPan, and ZigBee may encompass all past, current, and future versions of the wireless protocols. For Wi-Fi, PLC, and Ethernet, communication may be established through a communication gateway 239 such as a router/PLC/modem. Using a PCCC control web portal or a PCCC control app (PCCC dashboard application), the mobile device 235 may be used to communicate with the PCCC 205 through the communication gateway 239. Additionally, the communication gateway 239 may be connected to the Internet 241, thus making it possible for at least one of the remote servers 237 and the mobile device 235, using a PCCC control web portal or a PCCC control app, to communicate with the PCCC 205. Using the Bluetooth radio of the communication port 221, the mobile device 235 may also be capable of communicating with the PCCC 205 through the communication port 221. The powernet control communication cubes 205 may also communicate with each other through the communication port 221 using the Bluetooth radio, 6LoWPan radio, and/or ZigBee radio. The powernet control communication cubes 205 which are connected to the PLC may be nodes which in turn may be in communication with the powernet control communication cubes 205 which may not be connected to the PLC. Each PCCC node may be capable of identifying the powernet control communication cubes 205 which may be connected to it. This network of powernet control communication cubes 205 connected to PCCC nodes which are connected via PLC may be referred to as a powernet. Lastly, the GPS module 229 may provide location data for the PCCC 205 and may allow for the traceability of the PCCC 205 in event of its theft.

In embodiments, the RFID module 231 and Bluetooth module 233 of the PCCC 205 may be used to establish a beacon. The RFID module 231 may be used to monitor the space around the lighting fixture or device for any RFID transmitters. In a hospital setting, the RFID transmitters may be mounted onto tables, drug carts, wheel chairs, etc. The PCCC 205 may then be able to keep track of the RFID transmitters in the vicinity of the lighting fixture. The Bluetooth module 233 may be used to continuously ping the area around the lighting fixture for any nearby Bluetooth enabled devices. The vast majority of phones and devices since 2006 will respond to this pinging, thus enabling the PCCC 205 to map and monitor the number of people that are carrying Bluetooth phones and devices that may be in the vicinity of the lighting fixture. The processing of the RFID and Bluetooth monitoring may be handled locally by the at least one processor 211 of the PCCC 205. By having this map of people and things, if a patient is looking for a particular facility within the hospital, the path of least resistance (i.e. least congestion) for the patient to get to the particular facility may be determined from the data collected from RFID monitoring and Bluetooth pinging. This path may be transmitted to the patient who is running the hospital's mobile application on a Bluetooth enabled phone. In embodiments, the Bluetooth 233 may be used to transmit offers, promotions, or other information to an individual with a Bluetooth enabled phone running a particular store or promotion mobile application. In such a scenario, if a customer is shopping at a grocery store and is running a store's mobile application on a Bluetooth enabled phone and the customer approaches the soft drink aisle, the PCCC 205 may be able to determine that the customer is in the soft drink aisle and may be able to present the customer offers and promotions for products that are also in the soft drink aisle. The PCCC 205 may present offers for products that are available since the PCCC 205 uses its RFID module 231 to detect for products labeled with RFID tags.

Figure 3:
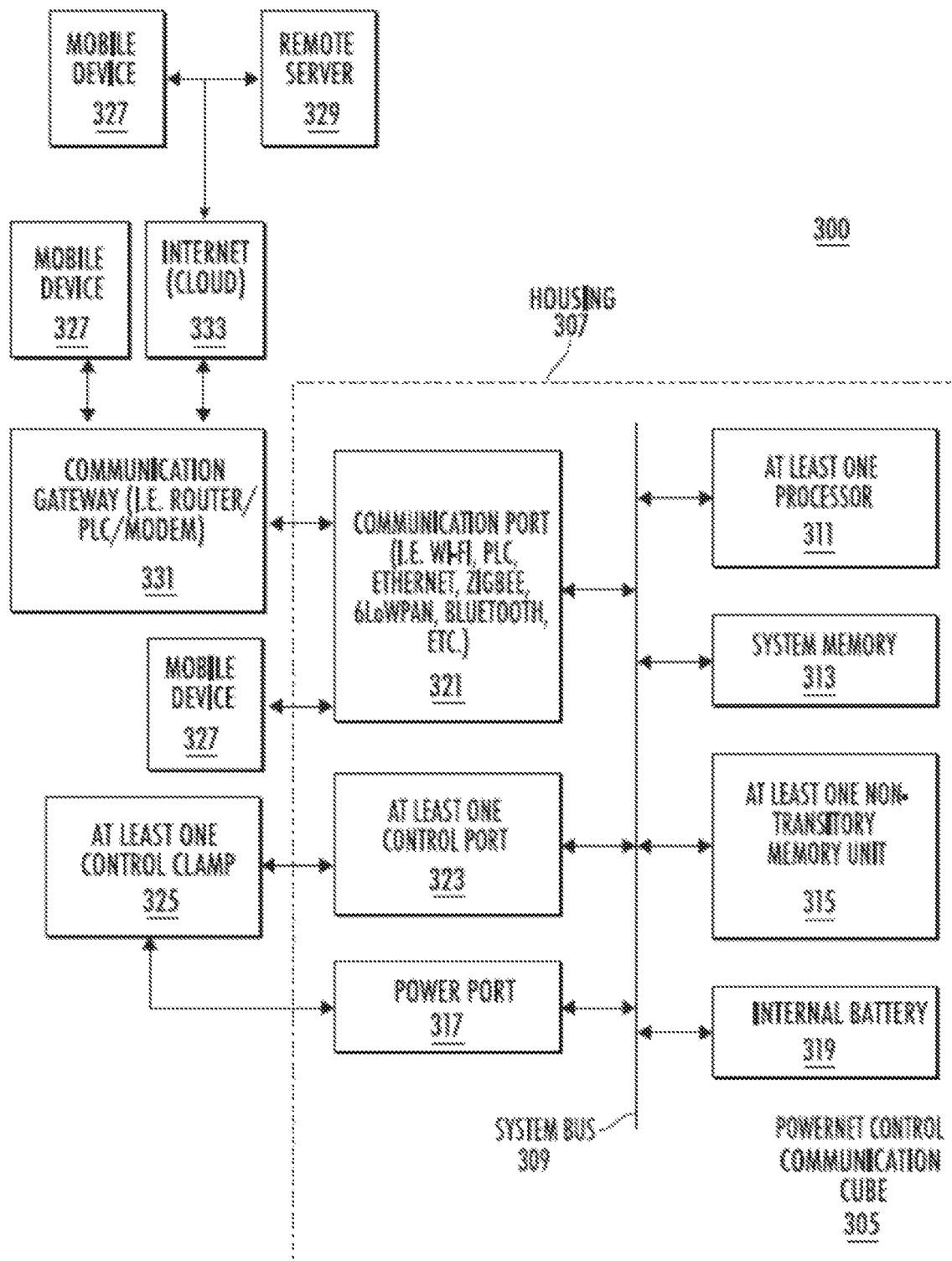
FIG. 3 is a block diagram illustrating an apparatus for monitoring, controlling, and communicating in accordance with embodiments.

FIG. 3 is a block diagram illustrating an apparatus for monitoring, controlling, and communicating in accordance with embodiments.

In embodiments, apparatus 300 may comprise at least one powernet control communication cube 305. The powernet control communication cube (PCCC) 305 may comprise a housing 307, a system bus 309, at least one processor 311, system memory 313, at least one non-transitory memory unit 315, a power port 317, an internal battery 319, a communication port 321, at least one control port 323, and at least one control clamp 325, all of which may be directly or indirectly coupled to each other.

In embodiments, the PCCC 305 may be mounted within a lighting fixture or on the back of a flat electrical strike plate and may be powered by the internal battery 319 or by using one of the control clamps 325 coupled to the power port 317 to tap into a power line. Alternatively, the power port 317 may draw its power internally from one of the control clamps 325 connected to the control port 323. The communication port 321 may comprise at least one of a Wi-Fi radio, a PLC bridge, an Ethernet port, ZigBee radio, 6LoWPan radio, and a Bluetooth radio and may allow for the communication between powernet control communication cubes 305 and external control and monitoring devices such as at least one of a mobile device 327 and a remote server 329. Bluetooth, 6LoWPan, and ZigBee may encompass all past, current, and future versions of the wireless protocols. For Wi-Fi, PLC, and Ethernet, communication may be established through a communication gateway 331 such as a router/PLC/modem. Using a PCCC control web portal or a PCCC control app (PCCC dashboard application), the mobile device 327 may be used to communicate with the PCCC 305 through the communication gateway 331. Additionally, the communication gateway 331 may be connected to the Internet 333, thus making it possible for at least one of the remote servers 329 and the mobile device 327, using a PCCC control web portal or a PCCC control app, to communicate with the PCCC 305. Using the Bluetooth radio of the communication port 321, the mobile device 327 may also be capable of communicating with the PCCC 305 through the communication port 321. The powernet control communication cubes 305 may also communicate with each other through the communication port 321 using the Bluetooth radio, 6LoWPan radio, and/or ZigBee radio. The powernet control communication cubes 305 which may be connected to the PLC may be nodes which in turn may be in communication with the powernet control communication cubes which are not connected to the PLC. Each PCCC node may be capable of identifying the powernet control communication cubes 305 which may be connected to it. This network of powernet control communication cubes 305 connected to PCCC nodes which are connected via PLC may be referred to as a powernet.

In embodiments, the PCCC 305 may be used to control a single lamp, a single fixture, and/or a series of fixtures. For such an embodiment, the PCCC 305 may be mounted within the lighting fixture and may be powered by the internal battery 319 or by one of the at least one control clamp 325 spliced into the power line to the lighting fixture. The control clamp 325 may be designed to splice the power line to a lighting fixture without having to shut down power to the lighting fixture or device. After splicing the power line, direct power to the lighting fixture may be removed and the PCCC 305 may now be capable of controlling the lighting fixture, thus enabling control for dimming, color, and other primary and secondary functions such as, but not limited to Li-Fi management and emergency controls. Since the control clamp is tapped into the power line, the control clamp may also be able to provide power to the PCCC 305 through the power port 317. This embodiment was similarly disclosed in FIG. 2, except that in this embodiment, the components not required for controlling a lighting system, (the at least one monitor sensor, the GPS, the RFID, and Bluetooth) have been eliminated.

In embodiments, the components for communication through the communication gateway may be separated from the components for communication between the powernet control communication cubes 305. In such an embodiment, the powernet control unit may comprise at least one of the Wi-Fi radio, the Ethernet port, and the power line communication (PLC) bridge and the communication cube 305 may comprise at least one of a Bluetooth radio, 6LoWPan radio, and ZigBee radio, as was similarly disclosed in FIG. 1, except that in this embodiment, the components not required for controlling a lighting system (the at least one monitor sensor, the GPS, the RFID, and Bluetooth) have been eliminated.

Figure 4:
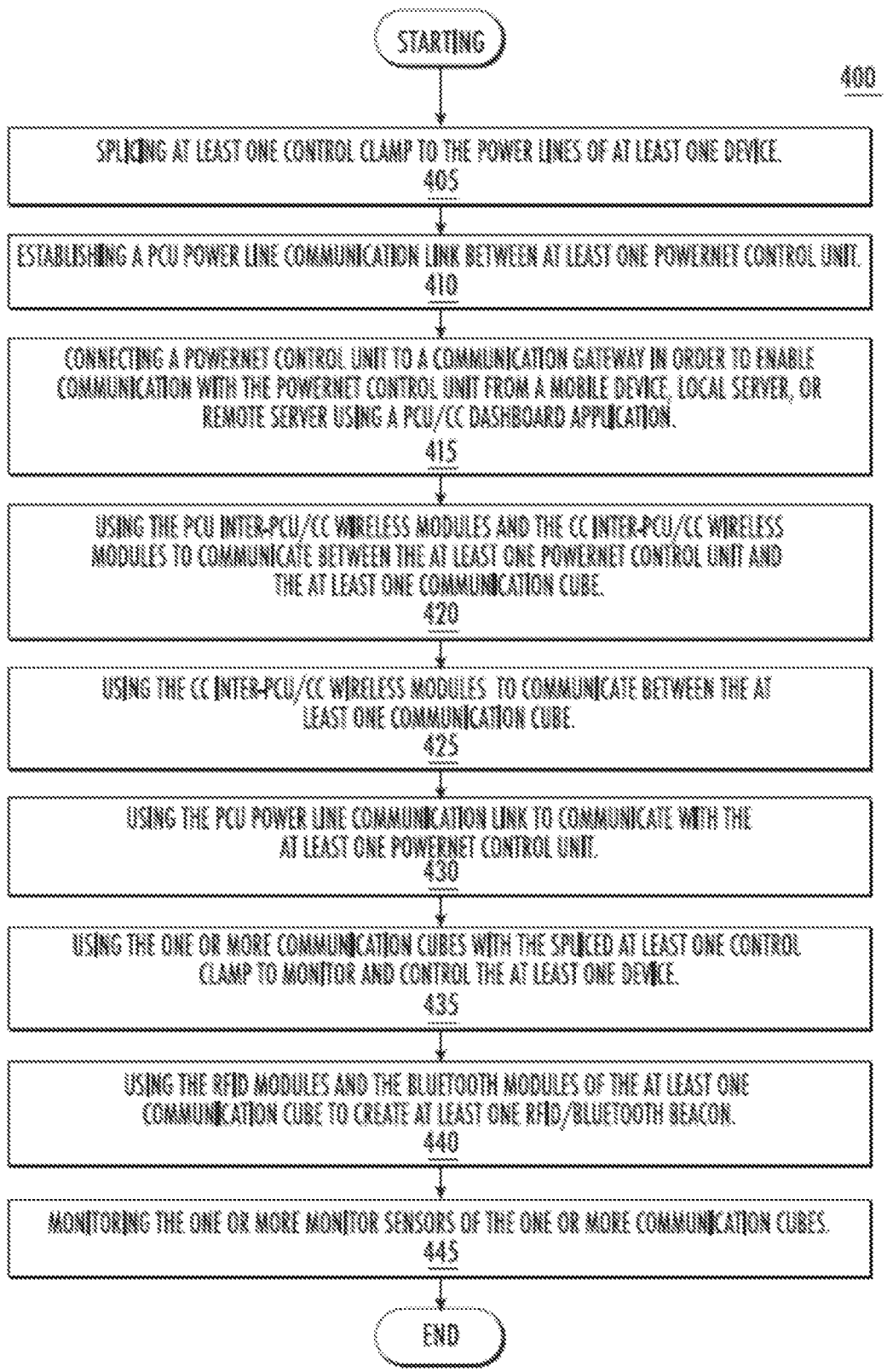
FIG. 4 is a block diagram illustrating a method for monitoring, controlling, and communicating of devices in accordance with embodiments.

FIG. 4 is a block diagram illustrating a method for monitoring, controlling, and communicating of devices in accordance with embodiments.

In embodiments, PCU code and CC code may be stored on the at least one PCU non-transitory memory unit and the at least one CC non-transitory memory unit, respectively, and executed by the at least one PCU processor and by the at least one CC processor, respectively, to perform a method 400 for monitoring, controlling, and communicating of devices. The method 400 illustrated in FIG. 4 may be performed by the apparatus illustrated in FIG. 1. Processing may begin in method 400 at block 405, wherein at least one control clamp may be spliced to the power lines of at least one device.

At block 410, a PCU power line communication link may be established for communication between at least one powernet control unit in embodiments.

At block 415, a powernet control unit may be connected to a communication gateway in order to enable communication with the powernet control unit from a mobile device, local server, or remote server using a PCU/CC dashboard application in embodiments.

At block 420, the PCU inter-PCU/CC wireless modules and the CC inter-PCU/CC wireless modules may be used to communicate between the at least one powernet control unit and the at least one communication cube in embodiments.

At block 425, the CC inter-PCU/CC wireless modules may be used to communicate between the at least one communication cubes in embodiments.

At block 430, the PCU power line communication link may be used to communicate with the at least one powernet control unit in embodiments.

At block 435, the at least one communication cube with the spliced at least one control clamp may be used to monitor and control the at least one device in embodiments.

At block 440, the RFID modules and the Bluetooth modules of the at least one communication cube may be used to create at least one RFID/Bluetooth beacon in embodiments.

At block 445, the at least one monitor sensor of the at least one communication cube may be monitored in embodiments. The at least one monitor sensor may be used to monitor for occupancy in the area of the device as well as the device location and status. Processing may subsequently end after block 445 in embodiments.

Figure 5:
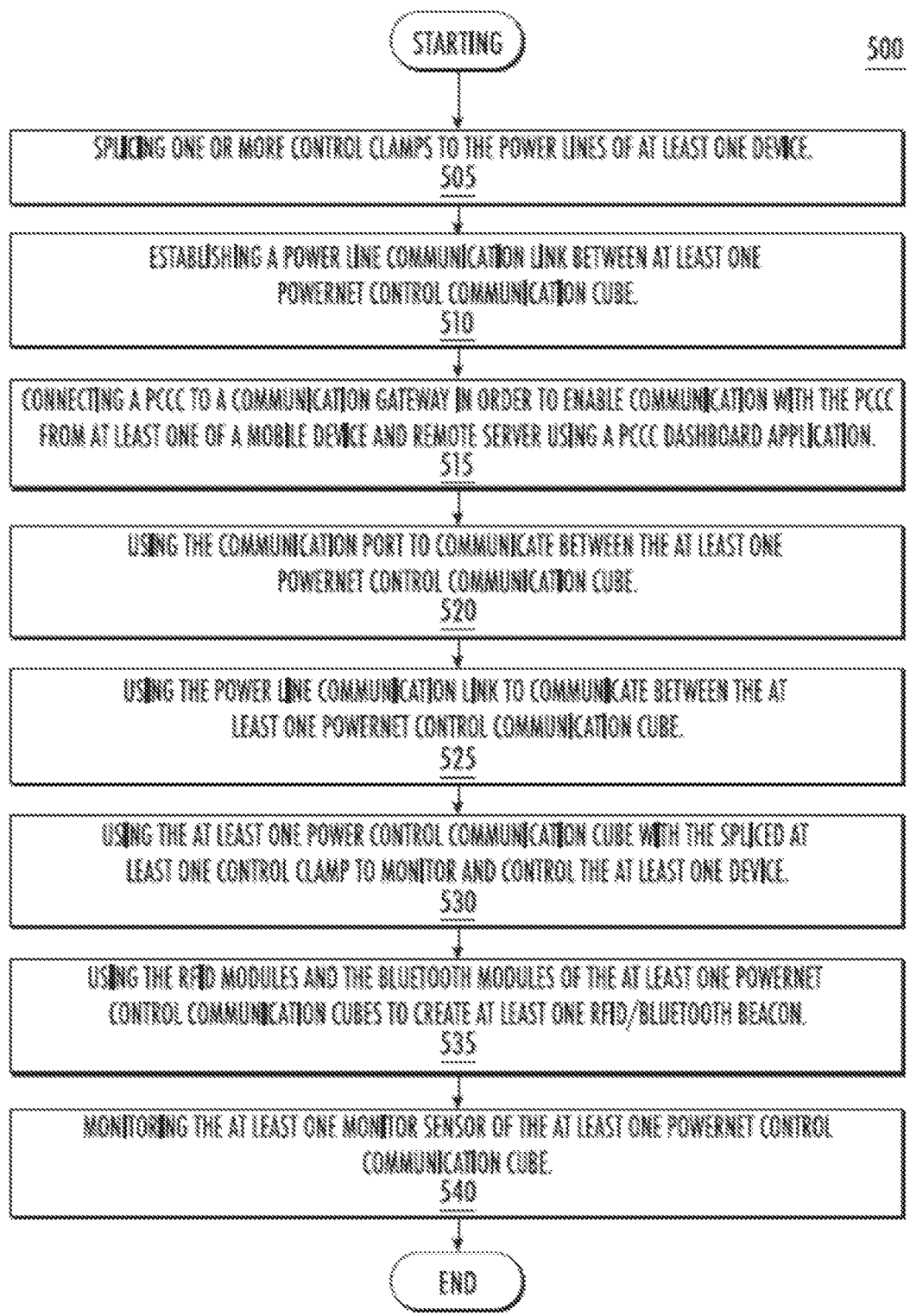
FIG. 5 is a block diagram illustrating a method for monitoring, controlling, and communicating of devices in accordance with embodiments.

FIG. 5 is a block diagram illustrating a method for monitoring, controlling, and communicating of devices in accordance with embodiments.

In embodiments, PCCC code may be stored on the at least one non-transitory memory unit and may be executed by the at least one processor to perform a method 500 for monitoring, controlling, and communication of devices. The method 500 illustrated in FIG. 5 may be performed by the apparatuses illustrated in FIG. 2 and FIG. 3. Processing may begin in method 500 at block 505, wherein at least one control clamp may be spliced to the power lines of at least one device.

At block 510, a power line communication link may be established for communication between at least one powernet control communication cube in embodiments.

At block 515, a PCCC may be connected to a communication gateway in order to enable communication with the PCCC from a mobile device and/or remote server using a PCCC dashboard application in embodiments.

At block 520, the communication port may be used to communicate between the at least one powernet control communication cube in embodiments.

At block 525, the power line communication link may be used to communicate between the at least one powernet control communication cube in embodiments.

At block 530, the at least one powernet control communication cube with the spliced at least one control clamp may be used to monitor and control the at least one device in embodiments.

At block 535, the RFID modules and the Bluetooth modules of the at least one powernet control communication cube may be used to create at least one RFID/Bluetooth beacon in embodiments.

At block 540, the at least one monitor sensor of the at least one powernet control communication cube may be monitored. The at least one monitor sensor may be used to monitor for occupancy in the area of the device as well as the device location and status. Processing may subsequently end after block 540 in embodiments.

Embodiments described herein relate to a computer storage product with at least one non-transitory memory unit having instructions or computer code thereon for performing various computer-implemented operations. The at least one memory unit are non-transitory in the sense that they do not include transitory propagating signals per se (e.g., a propagating electromagnetic wave carrying information on a transmission medium such as space or a cable). The at least one memory unit and computer code (also can be referred to as code) may be those designed and constructed for the specific purpose or purposes. Examples of at least one memory unit include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, Python, C, or other programming languages (e.g., object-oriented programming languages) and development tools. Additional examples of computer code include, but are not limited to, control signals, encrypted code, database code, and compressed code.

As discussed, a single multifunction communications cube (MCC) may have multiple means or subsystems for receiving and transmitting digital information. It will be understood that a multifunction communication cube (MCC) may include all, or a subset, of the same or similar components, features, and functionality of apparatus 100, apparatus 200, and apparatus 300 described in detail elsewhere in this application. The MCC may use its communications subsystems or inputs (Wi-Fi, ZigBee, Bluetooth, PCL, Ethernet, etc.) to generate a "digital impression" or "digital profile" including digital impression information of the devices in its environment. The digital impression may contain essentially all, or a subset of, signal information across all of the CC's detection means for each and every device that the MCC can detect. The digital impression information collected about different devices in the environment of the MCC may differ in relation to signal information available and collected by the CC. The MCC may monitor all of the inputs simultaneously, or in any suitable order to generate such a digital impression. Monitoring of inputs by the MCC may include monitoring all or a subset of communications subsystems of the CC. This digital impression may be limited only by the inherent limitations of the different input methodologies or input subsystems of the CC.

In an embodiment, for example, the CC's ability to monitor devices via its PLC inputs may be limited to devices connected to an electrical circuit accessible to the CC, while the devices observable via the CC's Bluetooth and Wi-Fi inputs may be limited to the communication reception ranges determined by each device's Bluetooth antenna range and Wi-Fi antenna range. The signal information from all inputs available to the MCC may be aggregated to generate the digital impression. Multiple CCs with overlapping sensor ranges may have separate digital impressions that contain devices that overlap, or alternatively, may be aggregated together to create a single, more thorough or complete digital impression of the devices around the plurality of networked CCs. In an embodiment, for example, a first MCC and second MCC in communication, directly or indirectly via other intermediate CC's relaying communications information between the first MCC and second CC, may have combined, coordinated, or cooperative capability to identify, monitor, and interact with devices via PLC inputs connected to any electrical circuit accessible or connected to either the first MCC and the second CC, and further may have combined, coordinated or cooperative capability to identify, monitor and interact with the same or other devices via Bluetooth and Wi-Fi inputs within wireless communication range of both the first MCC and second CC. In such an embodiment, for example, digital impressions of each of a plurality of devices may include digital impression information obtained via PLC inputs, Bluetooth inputs, and Wi-Fi inputs, of each and every device observable, directly or indirectly, by the first MCC and second CC.

In an exemplary scenario, if a MCC is installed into a powerline circuit in a room with a Wi-Fi enabled smart TV that is connected to the same powerline circuit as the CC, a Bluetooth and Wi-Fi enabled cell phone sitting by itself on a desk in the next room over, and a ZigBee enabled smoke detector connected to a separate powerline circuit in the hall between the two rooms, the MCC may receive both a PLC signal and a Wi-Fi signal from the TV, both Wi-Fi and Bluetooth signals from the cell phone, and a ZigBee signal from the smoke detector. The digital impression generated by the MCC would comprise all of these signals together.

The CC's onboard processor may aggregate this sensor data in order to generate the digital impression of the CC's environment. The MCC may then use its processor and information contained on its onboard memory to identify digital signatures of the different devices constituting the digital impression. If the digital impression cannot be disambiguated to determine the unique signatures identifying the constituent devices, the MCC may use one or more of its communications pathways to transmit the digital impression to a remote server, which may have access to more data and processing capabilities than the CC's onboard hardware in order to disambiguate the digital impression and determine what devices are being sensed by the CC. Once the digital impression has been disambiguated and the unique devices sensed by the MCC are identified that information along with control information for those devices may be communicated from the remote server back to the MCC through a suitable communication network. The unique device information may comprise information such as the make and model of the device, and may further comprise control information including, but not limited to control signals compatible with the identified device through one or more communications means, and a hierarchy of what communications means are preferred for controlling said device. Whether or not the MCC can determine the devices constituting the digital impression through onboard processing versus offboard processing at a remote server may be a question of the CC's form factor and current hardware limitations.

Once the MCC has either determined the identity of the devices that it sensed in its digital impression, or has received such information from the remote server, the MCC may then use any of the output methods available to it to communicate with and control the unique devices whose signals were include in the CC's digital impression. The determination of what communication means should be used to control which unique device may be associated with the information used to identify of the unique devices, and may be determined when the unique devices are identified. This control and control preference information may be stored either on the CC's or on the remote server's memory. This selection of the means by which to control the devices may be limited to the manner in which the MCC can communicate with that particular device (it would not be helpful for the MCC to try to control a Wi-Fi enabled TV via Wi-Fi if either the MCC does not possess Wi-Fi functionality, or if the MCC is in only powerline communication with the TV).

Continuing with the example provided above, once the MCC has formed a digital impression of its environment, including the PLC signature of the TV, the Wi-Fi signatures of the TV and the smartphone, the Bluetooth signature of the smartphone, and the ZigBee signature of the smoke detector, it may transmit this impression to a remote server, and receive back from the server information indicating the three devices and their control preferences. The stored device information indicates that the TV may be controlled via PLC, infra-red (IR), and Wi-Fi, but prefers to be controlled via IR or Wi-Fi; the smartphone prefers to be controlled by Bluetooth rather than Wi-Fi; and the smoke detector can be controlled by PLC or ZigBee and has no preference on which is better. In such a case, the MCC would control the TV via Wi-Fi as it is preferred over PLC and the MCC does not possess IR; the smartphone via Bluetooth as it is preferred over PLC; and the smoke detector via ZigBee as it is the only connection that the MCC has to that device.

In embodiments, the MCC may be limited to having fewer than all of the possible input and communications means. For example, one MCC may be configured for Ethernet and PLC communication only, while another MCC may be configured for Ethernet and Bluetooth communication only, while yet another MCC may be configured for wireless, Bluetooth, and PLC communication. Any permutation or combination of communication means may be provided for on any specific MCC without departing from the scope of this disclosure. Embodiments without the capability of at least one communications means may be termed a "limited CC". Multiple differently limited CCs, for example, one that is limited to Bluetooth and PLC, and one limited to Bluetooth and Wi-Fi, may communicate together via their shared communication protocol. In such an example the Bluetooth and PLC limited MCC may relay its digital impression to a remote server by using its shared communication protocol (in this case Bluetooth) to relay information to the other CC, which may then transmit both its digital impression and the digital impression received from the other limited MCC to the remote server via Wi-Fi.

In embodiments, a single MCC may be configured to use any and all suitable communications means.

Multiple CCs may be networked together via suitable communications networks. Multiple CCs in a particular physical location may be considered a "node". Multiple nodes may be connected together to form a network or MCC network. In embodiments, a single node may constitute a network or MCC network.

The CCs in a node may transmit and receive communications with one another in order to determine which of the CCs has the strongest connection to a communication network capable of transmitting information to a target device external to the node. The other CCs of the node may then relay information to the target device through the MCC with said strongest connection. The MCC through which the node's information is relayed may update in the event that the connection strength changes. This may allow all of the CCs in the node to be able to communicate with the remote device even if any particular MCC cannot directly communicate with said remote device. Furthermore, this relaying of information between networked CCs does not have to be direct, and may be indirect. For example, a first MCC may transmit information to a second CC, which may, in turn, transmit the information from the first MCC to a third CC, that may then transmit the information from the first MCC to a remote device. This ability to relay information through a series of networked CCs may also provide for a "gap jumping" ability, where an MCC that is not capable of transmitting directly to a remote device may relay information through one or a series of connected CCs until one of them is able to establish a connection to the remote device.

This relaying of information between networked CCs does not have to be direct, and may be indirect. In embodiments, a plurality of CCs constituting a node may be connected together in a mesh network configuration. Such a mesh network of CCs, for example, may relay information using either a flooding technique or a routing technique. To ensure all its paths' availability, the network may allow for continuous connections and should be able to reconfigure itself around broken paths, using self-healing algorithms. Self-healing allows a routing-based network to operate when a node breaks down or when a connection becomes unreliable. Utilizing such a mesh network configuration, a first MCC may transmit information to a second CC, which may in turn transmit the information from the first MCC to a third CC, that may then transmit the information from the first MCC to a remote device. This ability to relay information through a series of networked CCs may also provide for a "gap jumping" ability, where an MCC that is not capable of transmitting directly to a remote device may relay information through one or a series of connected CCs until one of them is able to establish a connection to the remote device.

Figure 6:
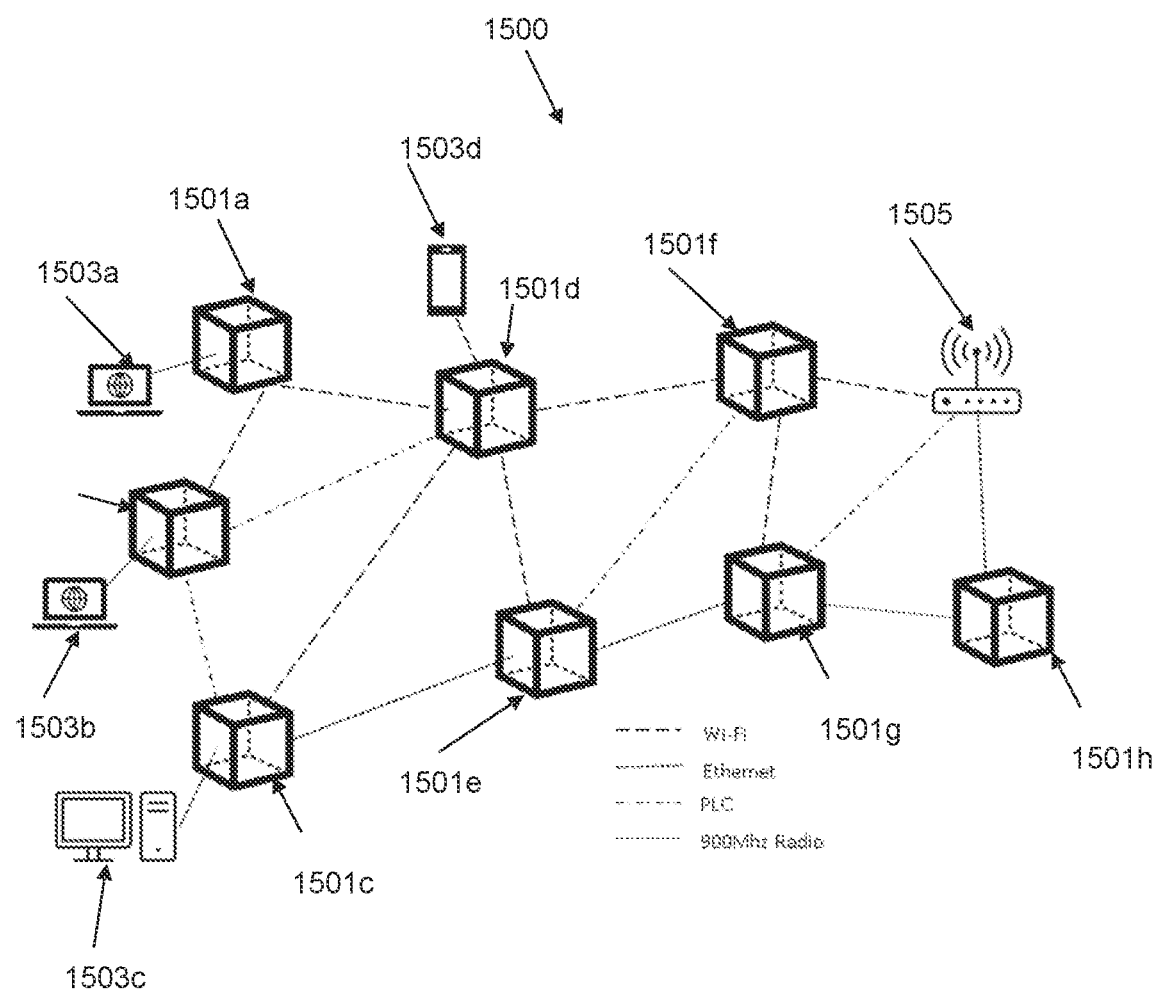
FIG. 6 is a diagram illustrating a sample mesh network environment in accordance with an embodiment of the present disclosure.

FIG. 6 is a diagram illustrating a network environment 1500 for purposes of describing a self-healing network embodiment. This network environment 1500 may correspond to a node mentioned above. For purposes of example, let us assume that the network environment 1500 comprises a plurality of CCs 1501*a*-1501*h* in an office building that are interconnected in a mesh network configuration. Each CC may be connected to one or more networked electronic devices 1503, such as computers, printers, cellular telephones, alarm system nodes, Wi-Fi routers, security cameras, digital temperature sensors (i.e., thermometers) and other environmental sensors, servers, and any other type of networkable electronic devices that might typically be found in an office building. In order not to obfuscate the drawing and the ensuing discussion, FIG. 6 shows only four of the electronic devices, namely, a first computer 1503*a* coupled to CC 1501*a*, a second computer 1503*b* coupled to CC 1501*b*, a server 1503*c* coupled to CC 1501*c*, and a smart phone 1503*d* coupled to CC 1501*d*. Each CC 1501 is able to communicate with at least one other CC, and, in most cases, with multiple other CCs, as shown, thereby forming a mesh network through which the electronic devices 1503 (as well as the CCs 1501) can communicate with each other and exchange data as needed. Each line (or edge) between any two CCs represents a direct communication path between those two CCs (hereinafter sometimes referred to as a "link"). As previously discussed, the various links may be of different communication modes. For example, in FIG. 6, the solid lines represent Digi 900 Mhz wireless communication links, the dot/dashed lines represent power line communication (PLC) links, the dashed lines represent Wi-Fi links, and the dotted lines represent Ethernet wired links.

Furthermore, as previously discussed, each CC 1501 may have more than one communication link with any other CC. For instance, CC 1501a may have an Ethernet link, a Wi-Fi link, and a PLC link with CC 1501b. However, again, for sake of not obfuscating the drawing, only one communication link per pair of CCs is assumed and shown in FIG. 6. Each CC may have a unique MAC address per communication mode. Thus, a CC that, for example, has Wi-Fi 2.4 GHz capabilities, Wi-Fi 5.2 GHz capabilities, Ethernet capabilities, and PLC capabilities would have four MAC addresses.

In this example, the network environment 1500 also includes a gateway 1505 that connects the network environment to the outside world, e.g., to the Internet, so that the devices 1503 and CCs 1501 can communicate with resources outside of the network environment in the building.

In an example, if computer 1503a needs to send data to a remote location outside of the network environment 1500, it would do so via the gateway 1505, which is a connection to outside world (e.g., the Internet). Thus, computer 1503a transmits the data to CC 1501a, which needs to get that data to the gateway 1505. However, CC 1501a does not have a direct connection to the gateway 1505. Thus, it must send the data to gateway 1505 via one or more other CCs 1501 in the network environment. As can be seen in FIG. 6, there are many options for transmitting the data from CC 1501a to gateway 1505. Merely as a few examples, in one case, the data can be transmitted from CC 1501a through CC 1501b, CC 1501c, CC 1501d, and 1501f to gateway 1505. This would comprise a total of five hops from the source CC 1501a to the gateway 1505. Alternately, it could be transmitted from CC 1501a through CC 1501e, and CC 1501f to gateway 1505. This route would comprise only three hops from source CC 1501a to gateway 1505. Many other routes also are available. Also, in certain cases, the network environment may have two or more gateways that connect to the internet, thereby providing an even greater variety of routes through the network environment to any given remote destination (as it would likely have multiple potential routes through the network environment to each of the gateways).

A routing algorithm through the mesh network should be selected to optimize the use of the network resources. U.S. patent application Ser. No. 17/484,592 filed Sep. 24, 2021, entitled METHODS, SYSTEMS, AND APPARATUS FOR ROUTING DATA IN A SELF-HEALING NETWORK AND FOR SELF-HEALING OF A NETWORK, which is incorporated herein in its entirety by reference, discloses suitable routing algorithms for such a system. In an embodiment, a plurality of CCs may cooperate to identify and share digital impression information regarding network routers and network security devices, such as network security packet sniffers, of a secured network for evading detection by the secured network routers and network security devices while identifying, monitoring, interacting with, and controlling devices on the secured network. The plurality of CCs may establish and communicate over a separate mesh communications network, or over any other network accessible to the plurality of CCs. In embodiments, where the plurality of CCs may have developed and shared, or may have received from a remote server, digital impression information regarding network routers and network security devices at an established or acceptable confidence level, one or more of the plurality of CCs may communicate over a separate mesh network established between the plurality of CCs, and/or may communicate over the secured network according to protocols that are unidentifiable or undetectable by the secured network routers and network security devices so as to remain "dark" and undetected. In embodiments, one or more of the plurality of CCs may also communicate over the secured network according to protocols that are compatible, identifiable, or detectable by the secured network routers and network security devices so as to spoof or simulate other devices known to be on the network, or that might belong on the network, to misinform the secured network routers and network security devices regarding the security or unsecured status of the secured network, and/or also to misinform network security devices regarding operations and operating status of devices identifiable, or known, by the CCs. It will be understood that the term "devices" may include firmware and software associated with hardware devices or nodes.

In embodiments, CCs may automatically assign themselves identifiers. Automatic identification of the CCs may be performed, for example, in accordance with a 6LoPan protocol. A plurality of networked CCs may automatically share digital impression information for devices detectable by, or known to, any of the plurality of CCs, and automatically share instructions for monitoring, interacting with, and controlling such devices.

In embodiments, the manner in which the MCC may be able to control the devices on its circuit vary depending on the device. For power modulation where there may no digital management capability. For example, for incandescent light bulb or older TVs, the only options will be off/on dim up/dim down. Those "commands" are managed through increasing or decreasing the voltage and/or current being transmitted to the device being controlled through the powerline. The MCC may effectuate such a modulation of voltage and/or current through the use of a series of circuits, or through a series of resistors/transistors if analog. For other devices, which may be controlled wirelessly, the MCC may provide control signals to the device through a suitable wireless communication means (e.g. Wi-Fi, Bluetooth, IR, etc.) rather than through modulation of the waveform of the power line into which the device is connected. For example, The MCC may identify a smart TV through the power line and identify it as a TV, and may then implement a control profile identified as usable via Wi-Fi or IR. The preference of control methodology for the specific device may associated with the unique device once it is identified. The preferred control means may be limited by the communications capabilities of the MCC that is trying to control the device.

Generally, not all electrical circuits in a building are connected. Even circuits within the same breaker panel are often not directly connected. Whether it is for meeting code requirements, load limit restrictions, security, redundancy, reduction of single point failure, or convenience, multiple distinct electrical circuits are used. Addressing these hurdles when implementing a network is an additional advantage of the MCC over current technologies. Multiple CC's can be networked together to create a mesh network spanning large open areas. Multiple CC's can also be connected to communicate along that circuit over great distances and through physical barriers like floors, walls, and ceilings. These CCs may be able to communicate with one another through alternate compatible communications means or subsystems if one such means of communication is not available. For example, if two CCs both have Wi-Fi functionality and are within Wi-Fi range of one another, but are not connected to the same powerline circuit, the two CC's may communicate through the Wi-Fi network (or indirectly through the MCC mesh network) rather than communicating via PLC. Since all CCs in proximity are able to communicate as programmed (meeting designated network security requirements), either wirelessly, wired, or both, a network of CC's can "jump" significant distances between electrical circuits, through physical barriers like floors and walls where wireless signals would not otherwise penetrate via powerline, or through electromagnetic barriers, via a wireless and/or wired mesh network. It will be understood that electromagnetic barriers may include, for example, a Faraday cage electromagnetic barrier.

Figure 7:
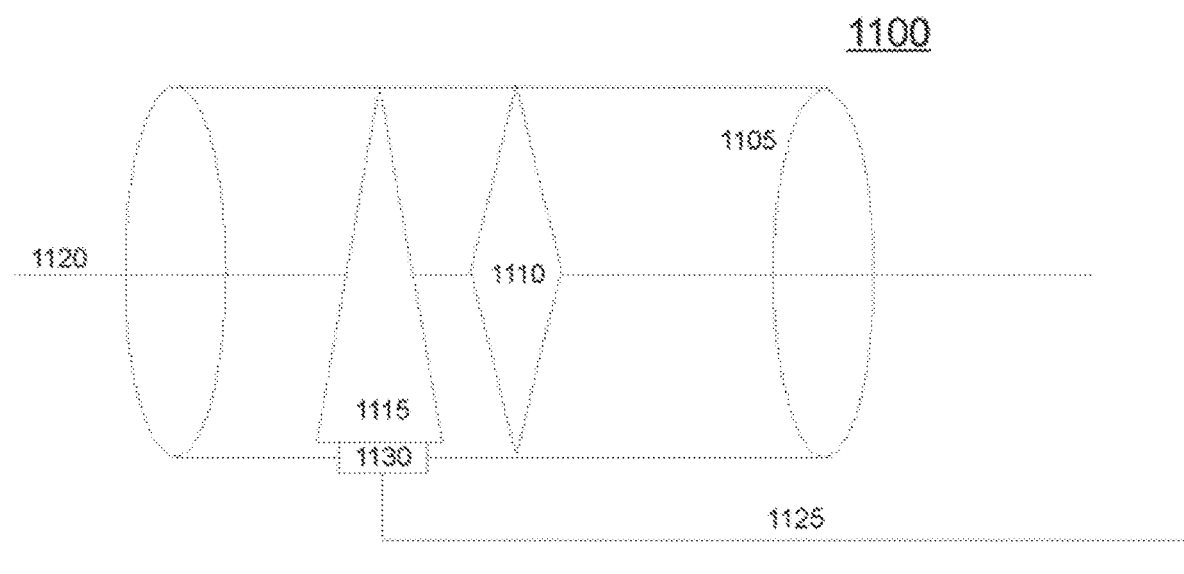
FIG. 7 illustrates aspects of a clamp for connecting a multifunction communication cube (MCC) to an electrical power circuit, in an embodiment.

As shown in FIG. 7, a multifunction communication cube (MCC) may be connected or spliced into an electrical circuit without interrupting the downstream power flow of the circuit through use of a specially designed clamp. Referring to FIG. 7, clamp 1100 may be an insulated tube 1105 that has a single, non-conductive (glass, ceramic, etc.) blade 1110. In some embodiments, clamp 1100 may include a conductive blade 1115 that may be narrower at the top than at the bottom, and made of a conductive material (copper at minimum) and a contact pad 1130 connected to the top of the conductive blade via solder, wire etc. The contact pad 1130 allows for current to flow from the inside of the insulated tube 1105 to the outside of the insulated tube 1105. The contact pads 1130 have a wire connector 1125 that may transfer power from the insulated tube 1105 to an external device (not shown). It will be understood that this design accommodates a single wire 1120 conductor.

U.S. Pat. No. 11,102,115, which is incorporated herein by reference in its entirety, discloses additional methods, apparatus, and embodiments for connecting a communication cube into an electrical circuit without interrupting the downstream power flow.

Figure 8:
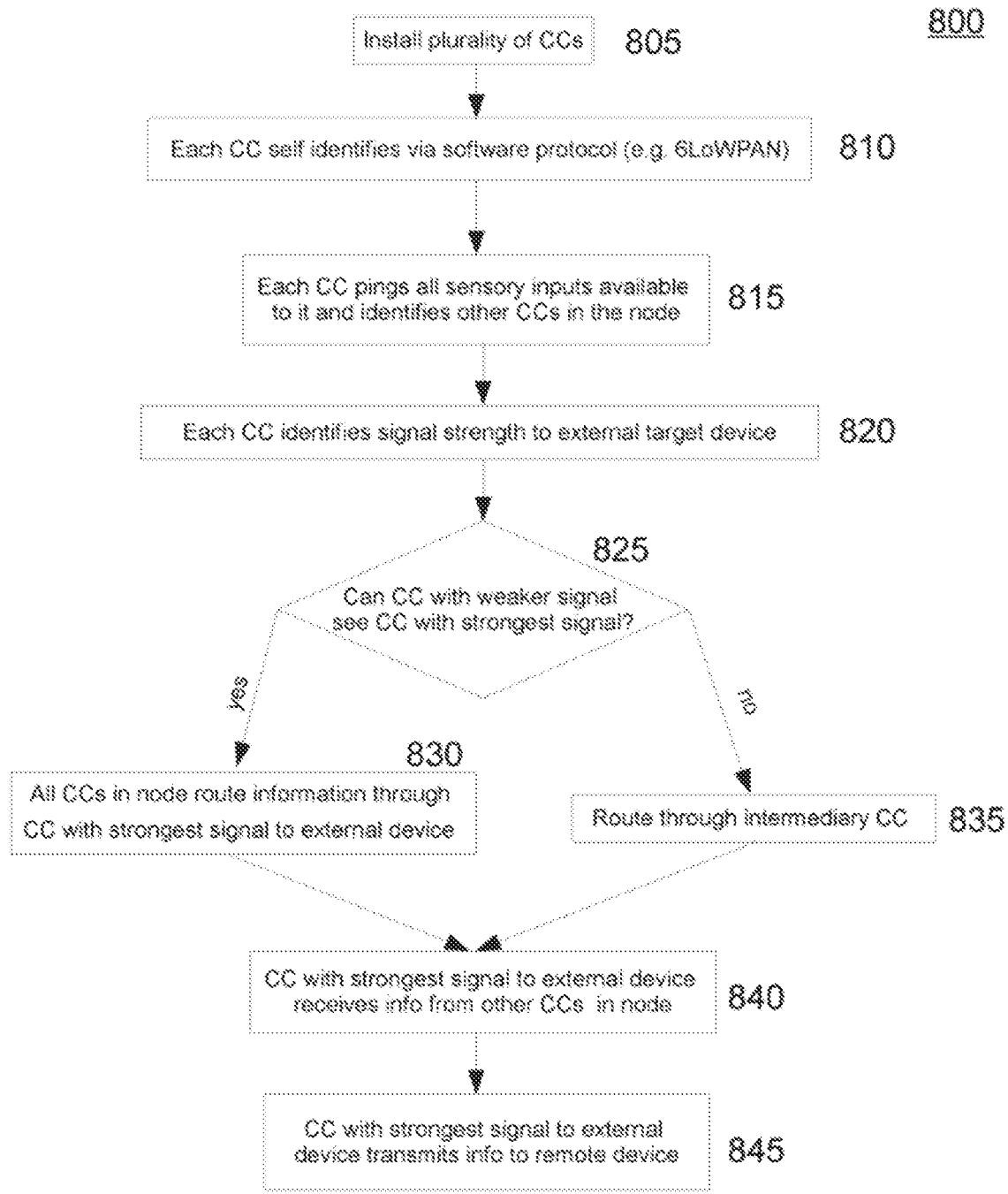
FIG. 8 illustrates a method for communicating with, identifying, monitoring, and controlling electronic devices connected to a circuit, in an embodiment.

Referring to FIG. 8, in an embodiment disclosed subject matter includes method 800 for identification, communication, monitoring, and control of electronic devices at a site or node. Method 800 may include installing 805 a plurality of multifunction communication cubes (CC's) at the site or node. It will be understood that each multifunction communication cube (CC) may have a construction, features and functionality as described elsewhere in this application. A site may include, for example, at least one subject wired circuit, at least one subject wireless communication channel, or both, connected to at least one subject electronic device. Method 800 may include self-identifying 810 by each MCC via a self-identification protocol. A suitable self-identification protocol may be embodied in processor accessible code, such as software code. In an embodiment, a suitable self-identification protocol is 6LowPan. Method 800 may include pinging 815 by each MCC all sensory inputs, including available communications inputs, to identify all other CCs in the node. Method 800 may include identifying 820 by each MCC signal strength to an external target device such as, for example, a wireless network access point or wireless communications transceiver, for communication to a remote server over an external communications network such as, for example, the Internet. It will be understood that a suitable wireless communications transceiver may include a transceiver of a wireless mobile data network or cellular communications network. Method 800 may include identifying 820 signal strengths from each MCC to an external target device. Method 800 may include determining 825 whether each MCC having a relatively weaker signal strength to an external target device can see and enter into communications with another MCC having relatively strongest signal strength to an external target device. Method 800 may include direct routing 830 of information by all CCs in the node through an MCC identified as having the relatively strongest signal strength to an external target device. Method 800 may include indirect routing 835 of information by any CCs in the node to an intermediary MCC and from the intermediary MCC through an MCC identified as having the relatively strongest signal strength to an external target device. Method 800 may include receiving 840 information by an MCC identified as having the relatively strongest signal strength to an external target device, from other CCs in the node. Method 800 may include transmitting 845 information by the MCC identified as having the relatively strongest signal strength to an external target device, to said external target device. It will be understood that the particular MCC identified as having relatively strongest signal strength to an external target device may change from time to time as conditions at the site change, or as external target devices such as external wireless infrastructure changes. It will be understood that method 800 may be performed by any suitable system such as, for example, system 900 shown in FIG. 9.

Figure 9:
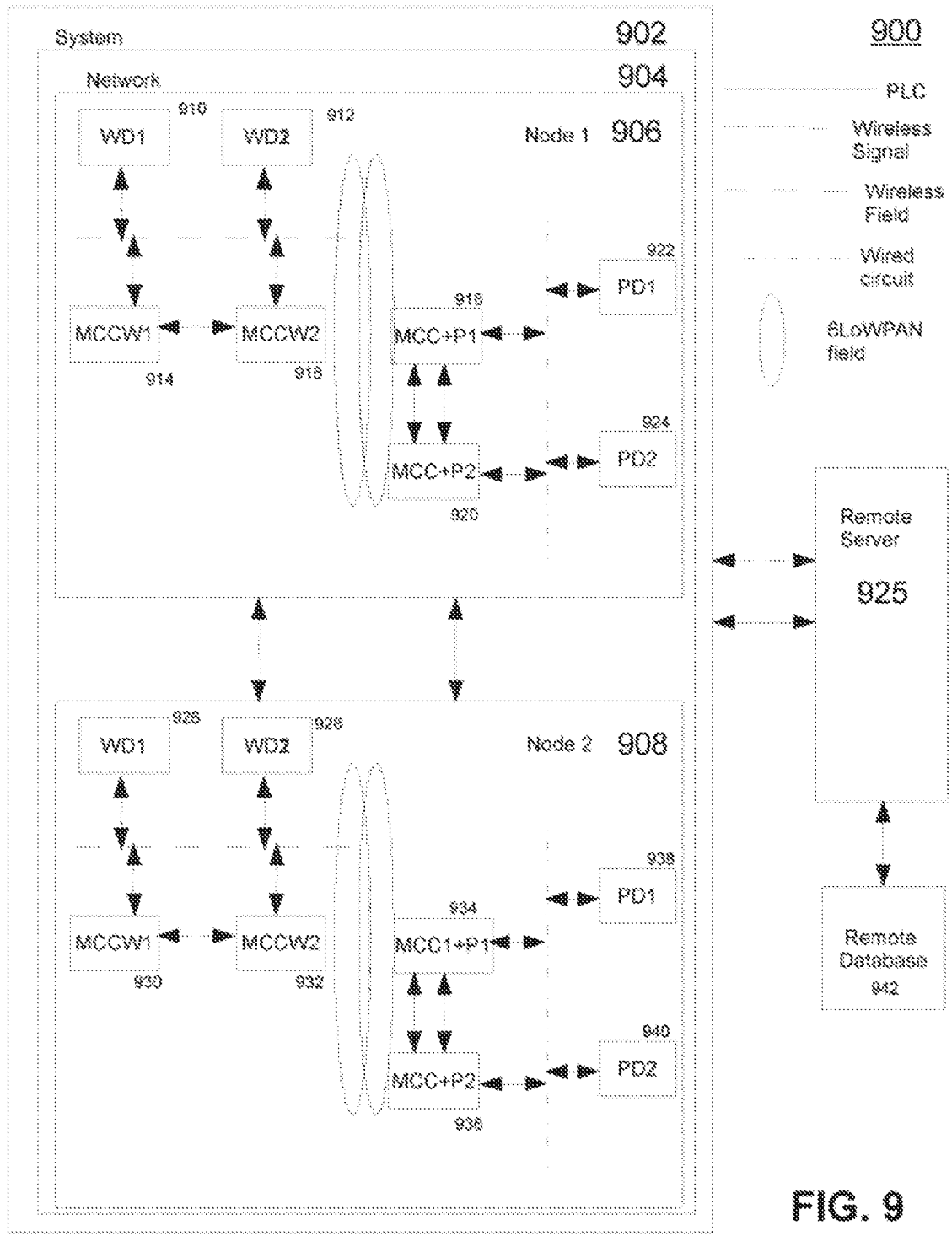
FIG. 9 illustrates a system for communicating with, identifying, monitoring, and controlling electronic devices connected to a circuit, in an embodiment.

Referring to FIG. 9, in an embodiment disclosed subject matter includes system 900 for identification, communication, monitoring, and control of electronic devices at a site. System 900 may include a first node 906 and second node 908 at the site. The first node 906 and second node 908 may be identical, except that each node may be connected to different infrastructure at the site and/or each node may include different sets or groups of multifunction communication cubes (MCC's). The first node 906 is exemplary and will be described in further detail. First node 906 may include a plurality of multifunction communication cubes (MCC's) (914, 916, 918, 920) at the site. It will be understood that each multifunction communication cube (914, 916, 918, 920) may include all, or a subset, of the same or similar components, features, and functionality of apparatus 100, apparatus 200, and apparatus 300 described in detail elsewhere in this application. In the particular embodiment shown in FIG. 9, the multifunction communication cubes (MCC's) are more specifically characterized by reference to such devices including wireless communications subsystems (MCCW1, MCCW2), and other such devices including both wireless communications subsystems and wired or powerline connections (designated MCCW+P1, MCCW+P2). First node 906 may include, for example, multifunction communication cubes (MCC's designated MCCW+P1, MCCW+P2) connected to a subject wired circuit having at least one subject wired device (PDI, PD2) connected thereto. A subject circuit may be, for example, an electrical circuit of a building to provide power to electronic devices, or any other suitable circuit such as a wired Ethernet connection of such a building. As shown in FIG. 9, each MCC may be connected to at least one conductor of the subject circuit via a clamp as described elsewhere and shown in FIG. 7, or may be otherwise connected or installed in conductive relationship with at least one conductor or wire of the subject circuit. First node 906 may include, for example, multifunction communication cubes (MCC's designated MCCW1, MCCW2, MCCW+P1, MCCW+P2) each connected to subject wireless communication channels and providing wireless connections to each subject wireless electronic device (WDI, WD2) within wireless reception and transmission range of such multifunction communication cubes (MCC's designated MCCW1, MCCW2, MCCW+P1, MCCW+P2). A subject wireless communication channel may be, for example, a ZigBee, Wi-Fi or Bluetooth wireless communication channel or infrastructure associated with the building or structure at the site, associated with a network at the site, or associated with subject wireless electronic devices present at the site. Each MCC may ping over all available inputs (P1, P2) of the MCC to a subject wired circuit to subject wired devices (PDI, PD2) and to subject wireless communications channels to subject wireless devices (WDI, WD2). The plurality of multifunction communication cubes (MCC's designated MCCW1, MCCW2, MCCW+P1, MCCW+P2) each may also include suitable wireless communication subsystems, such as 6LoWPAN subsystems, providing wireless communication channels and enabling wireless connections with each other multifunction communication cube (MCC's designated MCCW1, MCCW2, MCCW+P1, MCCW+P2) within wireless reception and transmission range of such multifunction communication cubes (MCC's designated MCCW1, MCCW2, MCCW+P1, MCCW+P2). Each of the multifunction communication cubes (MCC's designated MCCW1, MCCW2, MCCW+P1, MCCW+P2) may receive device signal information, signal noise, and/or conflated device signals via available inputs of the MCC from the respective subject circuits and subject wireless communications channels. Each of the multifunction communication cubes (MCC's designated MCCW1, MCCW2, MCCW+P1, MCCW+P2) may aggregate by an MCC local processor device signal information, signal noise and/or conflated device signals recorded from each of the inputs of the CC, to generate an aggregated digital impression or multidimensional digital impression information including recorded signal noise and recorded wireless communications information. Each of the multifunction communication cubes (MCC's designated MCCW1, MCCW2, MCCW+P1, MCCW+P2) may perform disambiguation determining or analyzing of constituent unique device waveforms in recorded device signal information, signal noise and/or conflated device signals, by the local processor of the MCC comparing the recorded device signal information, signal noise and/or conflated device signals with samples of known unique device waveforms of known devices and/or devices previously or contemporaneously identified at the site, which are stored in MCC memory and/or stored in a local database of the MCC or any MCC in communication with the subject MCC at the site. Each of the multifunction communication cubes (MCC's designated MCCW1, MCCW2, MCCW+P1, MCCW+P2) may perform local identifying of devices from the aggregated digital impression information by the MCC. Each of the multifunction communication cubes (MCC's designated MCCW1, MCCW2, MCCW+P1, MCCW+P2) may perform transmitting of aggregated digital impression information from the MCC to a remote device, such as a remote server 925, via a connection to an external communications network. It will be understood that, for example, the remote server 925 may be accessed over the Internet. Remote server 925 may perform remote disambiguation determining or analyzing of aggregated digital impression or multidimensional digital impression information including recorded signal noise and recorded wireless communications information to identify constituent unique device waveforms in recorded device signal information, signal noise and/or conflated device signals, and to identify constituent device wireless communications properties or wireless constituent device identification information, by a remote processor of the remote server 925 comparing the recorded device signal information, signal noise and/or conflated device signals with samples of known unique device waveforms of known devices and/or devices previously or contemporaneously identified at the site, and comparing recorded wireless communications information with known wireless communications information or properties of known devices or device types to identify constituent device wireless communications properties or wireless constituent device unique identification information, which are stored in memory (not shown) associated with the remote server and/or stored in a remote database (not shown). It will be understood that one suitable database of known devices and device waveforms and identification information may be, for example, the MIT Project Dilon signal fingerprint database. Remote server 925 may perform analyzing to identify devices connected to a subject circuit or capable of communicating over a subject wireless communication channel or wireless infrastructure at the site, by identifying unique device waveforms of known devices that produce same, or identifying device wireless communications information or properties of known devices, from the remote database. Remote server 925 may transmit identification information of devices from the remote server over a suitable communications network to the multifunction communication cubes (MCC's designated MCCW1, MCCW2, MCCW+P1, MCCW+P2). Each of the multifunction communication cubes (MCC's designated MCCW1, MCCW2, MCCW+P1, MCCW+P2) may perform associating of device control pathways, such as command signals, with each identified device connected to a subject circuit connected to a multifunction communication cube (MCC's designated MCCW1, MCCW2, MCCW+P1, MCCW+P2) or visible over a wireless communications connection or channel to a multifunction communication cubes (MCC's designated MCCW1, MCCW2, MCCW+P1, MCCW+P2), by a processor of the same. It will be understood that command signals of devices may be obtained from local memory of the multifunction communication cubes (MCC's designated MCCW1, MCCW2, MCCW+P1, MCCW+P2). Multifunction communication cubes (MCC's designated MCCW1, MCCW2, MCCW+P1, MCCW+P2) by the local MCC processor may generate or transmit command signals or control signals associated with identified devices connected to the subject circuit, and/or over a wireless communications connection or channel, to interact with and control aspects of such identified devices. It will be understood that, in some embodiments, command signals or control signals may be communicated to such identified devices over a wireless connection to an identified device, via a suitable wireless subsystem of the multifunction communication cubes (MCC's designated MCCW1, MCCW2, MCCW+P1, MCCW+P2). It will be understood that the first node 906 and second node 908 may communicate and share information regarding wired electronic devices (PD1, PD2) and wireless devices (WD1, WD2).

Figure 10:
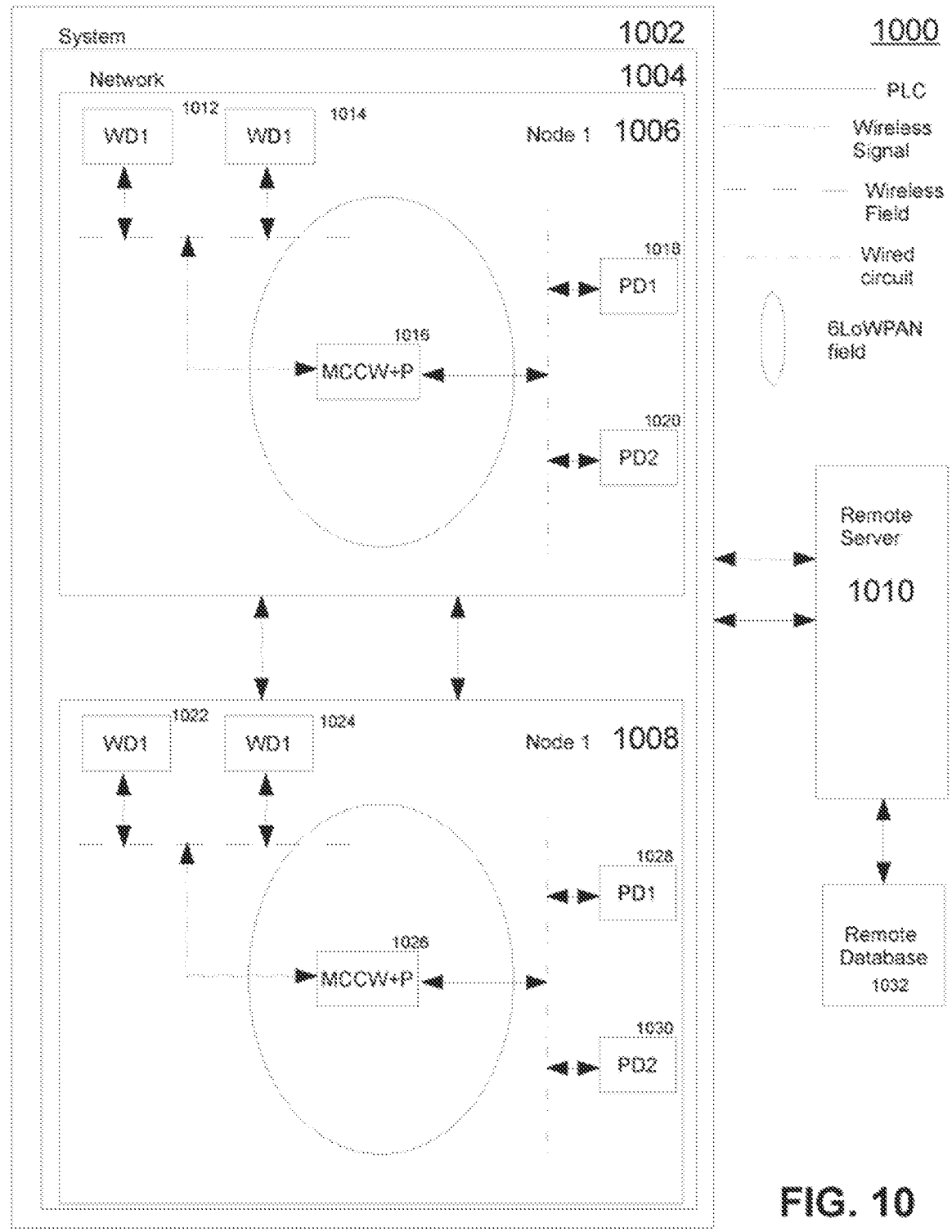
FIG. 10 illustrates a system for communicating with, identifying, monitoring, and controlling electronic devices connected to a circuit, in an embodiment.

FIG. 10 illustrates a system 1000 including network 1004 having a first node 1006 and second node 1008. Each of the first node 1006 and second node 1008 include a respective single multifunction communication cube (MCC) (1016, 1026) having wireless and wired communications capabilities and subsystems. System 1000 may be otherwise identical, or substantially similar, to system 900 illustrated in FIG. 9.

Figure 11:
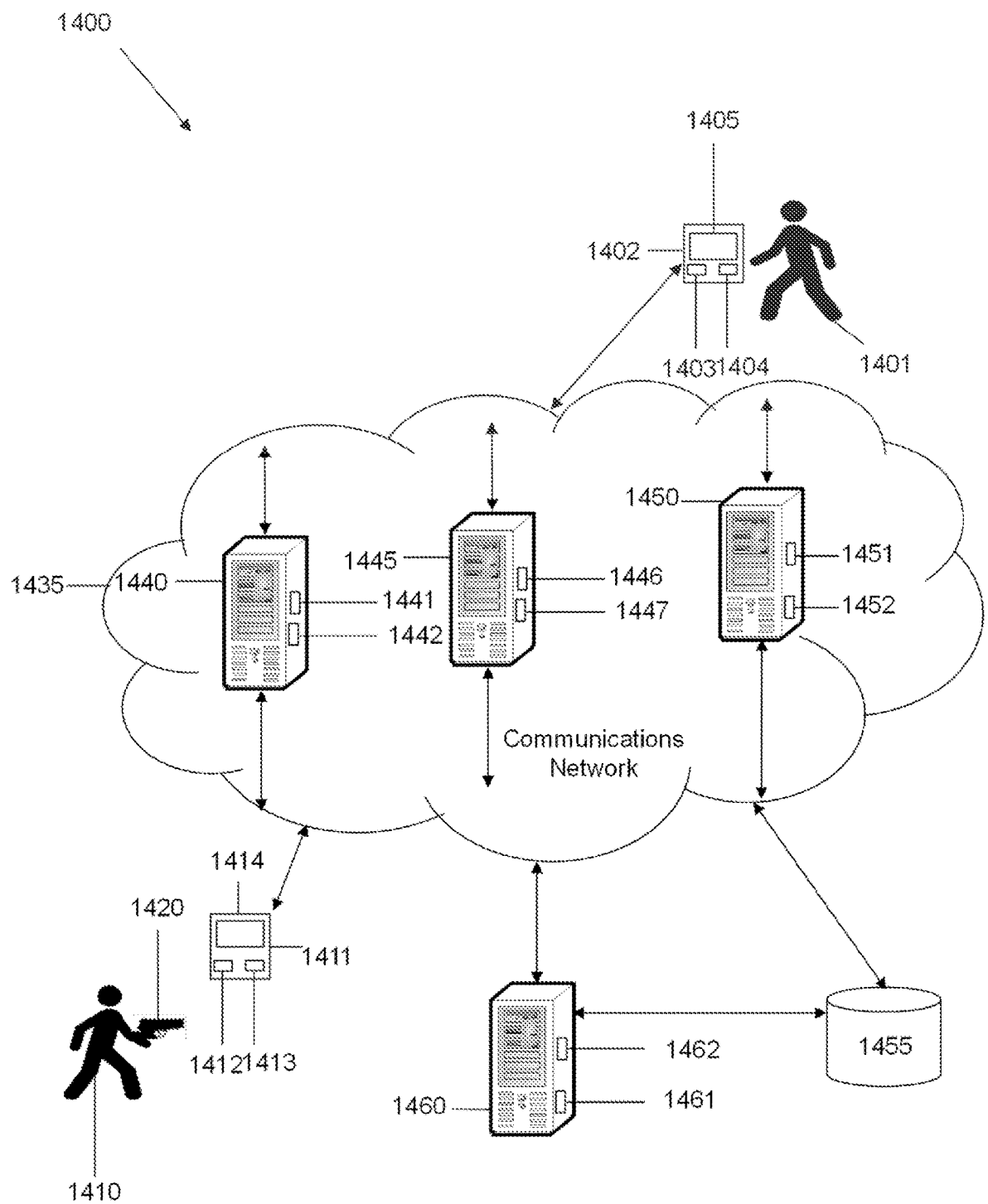
FIG. 11 is a schematic diagram illustrating a system for facilitating self-healing of a network according to an embodiment of the present disclosure.

Referring now also to FIG. 11, the systems illustrated in any of the previously discussed Figures may also be configured to operate with system 1400. The system 1400 may be configured to couple with the systems in those Figures, interact with the systems in those Figures, facilitate the operative functionality of the systems in those Figures, and/or conduct any of the functionality described in the present disclosure. Notably, the system 1400 may be configured to support, but is not limited to supporting, monitoring systems and services, data analytics systems and services, artificial intelligence services and systems, machine learning services and systems, content delivery services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and/or any other computing applications and services. Notably, the system 1400 may include a first user 1401, who may utilize a first user device 1402 to access data, content, and services, or to perform a variety of other tasks and functions. As an example, the first user 1401 may utilize first user device 1402 to transmit signals to access various online services and content, such as those available on an internet, on other devices, and/or on various computing systems. As another example, the first user device 1402 may be utilized to access an application that provides any or all of the operative functions of the system 1400. In certain embodiments, the first user 1401 may be a bystander, any type of person, a robot, a humanoid, a program, a computer, any type of user, or a combination thereof, that may be located in a particular environment. The first user device 1402 may include a memory 1403 that includes instructions, and a processor 1404 that executes the instructions from the memory 1403 to perform the various operations that are performed by the first user device 1402. In certain embodiments, the processor 1404 may be hardware, software, or a combination thereof. The first user device 1402 may also include an interface 1405 (e.g. screen, monitor, graphical user interface, etc.) that may enable the first user 1401 to interact with various applications executing on the first user device 1402 and to interact with the system 1400. In certain embodiments, the first user device 1402 may be and/or may include a computer, any type of sensor, a laptop, a set-top-box, a tablet device, a phablet, a server, a mobile device, a smartphone, a smart watch, and/or any other type of computing device. Illustratively, the first user device 1402 is shown as a smartphone device in FIG. 11. In certain embodiments, the first user device 1402 may be utilized by the first user 1401 to control and/or provide some or all of the operative functionality of the system 1400.

In addition to using first user device 1402, the first user 1401 may also utilize and/or have access to additional user devices. As with first user device 1402, the first user 1401 may utilize the additional user devices to transmit signals to access various online services and content. The additional user devices may include memories that include instructions, and processors that execute the instructions from the memories to perform the various operations that are performed by the additional user devices. In certain embodiments, the processors of the additional user devices may be hardware, software, or a combination thereof. The additional user devices may also include interfaces that may enable the first user 1401 to interact with various applications executing on the additional user devices and to interact with the system 1400. In certain embodiments, the first user device 1402 and/or the additional user devices may be and/or may include a computer, any type of sensor, a laptop, a set-top-box, a tablet device, a phablet, a server, a mobile device, a smartphone, a smart watch, and/or any other type of computing device, and/or any combination thereof. Sensors may include, but are not limited to, motion sensors, pressure sensors, temperature sensors, light sensors, heart-rate sensors, blood pressure sensors, sweat detection sensors, breath-detection sensors, stress-detection sensors, any type of health sensor, humidity sensors, any type of sensors, or a combination thereof. The sensors for the first user device 1402 may communicate with the sensors of any of the communication cubes as disclosed in the present disclosure.

The first user device 1402 and/or additional user devices may belong to and/or form a communications network. In certain embodiments, the communications network may be a local, mesh, or other network that enables and/or facilitates various aspects of the functionality of the system 1400. In certain embodiments, the communications network may be formed between the first user device 1402 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 1400 and/or outside the system 1400. In certain embodiments, the first user device 1402 and/or additional user device may form a mesh network with the communication cubes described in the present disclosure In addition to the first user 1401, the system 1400 may also include a second user 1410. The second user device 1411 may be utilized by the second user 1410 (or even potentially the first user 1401) to transmit signals to request various types of content, services, and data provided by and/or accessible by communications network 1435 or any other network in the system 1400. In further embodiments, the second user 1410 may be a robot, a computer, a humanoid, an animal, any type of user, or any combination thereof. The second user device 1411 may include a memory 1412 that includes instructions, and a processor 1413 that executes the instructions from the memory 1412 to perform the various operations that are performed by the second user device 1411. In certain embodiments, the processor 1413 may be hardware, software, or a combination thereof. The second user device 1411 may also include an interface 1414 (e.g. screen, monitor, graphical user interface, etc.) that may enable the first user 1401 to interact with various applications executing on the second user device 1411 and to interact with the system 1400. In certain embodiments, the second user device 1411 may be a computer, a laptop, a set-top-box, a tablet device, a phablet, a server, a mobile device, a smartphone, a smart watch, and/or any other type of computing device. Illustratively, the second user device 1411 is shown as a mobile device in FIG. 11. In certain embodiments, the second user device 1411 may also include sensors, such as, but are not limited to, motion sensors, pressure sensors, temperature sensors, light sensors, heart-rate sensors, blood pressure sensors, sweat detection sensors, breath-detection sensors, stress-detection sensors, any type of health sensor, humidity sensors, any type of sensors, or a combination thereof.

The system 1400 may also include a communications network 1435. The communications network 1435 may be under the control of a service provider, the first user 1401, the second user 1410, any other designated user, a computer, another network, or a combination thereof. The communications network 1435 of the system 1400 may be configured to link each of the devices in the system 1400 to one another. For example, the communications network 1435 may be utilized by the first user device 1402 to connect with other devices within or outside communications network 1435. Additionally, the communications network 1435 may be configured to transmit, generate, and receive any information and data traversing the system 1400. In certain embodiments, the communications network 1435 may include any number of servers, databases, or other componentry. The communications network 1435 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 1440, 1445, and 1450 are shown as being included within communications network 1435. In certain embodiments, the communications network 1435 may be part of a single autonomous system that is located in a particular geographic region, or be part of multiple autonomous systems that span several geographic regions.

Notably, the functionality of the system 1400 may be supported and executed by using any combination of the servers 1440, 1445, 1450, and 1460. The servers 1440, 1445, and 1450 may reside in communications network 1435, however, in certain embodiments, the servers 1440, 1445, 1450 may reside outside communications network 1435. The servers 1440, 1445, and 1450 may provide and serve as a server service that performs the various operations and functions provided by the system 1400. In certain embodiments, the server 1440 may include a memory 1441 that includes instructions, and a processor 1442 that executes the instructions from the memory 1441 to perform various operations that are performed by the server 1440. The processor 1442 may be hardware, software, or a combination thereof. Similarly, the server 1445 may include a memory 1446 that includes instructions, and a processor 1447 that executes the instructions from the memory 1446 to perform the various operations that are performed by the server 145. Furthermore, the server 150 may include a memory 1451 that includes instructions, and a processor 1452 that executes the instructions from the memory 1451 to perform the various operations that are performed by the server 1450. In certain embodiments, the servers 1440, 1445, 1450, and 1460 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 14440, 1445, 1450 may be communicatively linked to the communications network 1435, any network, any device in the system 1400, or any combination thereof.

The database 1455 of the system 1400 may be utilized to store and relay information that traverses the system 1400, cache content that traverses the system 1400, store data about each of the devices in the system 1400 and perform any other typical functions of a database. In certain embodiments, the database 1455 may be connected to or reside within the communications network 1435, any other network, or a combination thereof. In certain embodiments, the database 1455 may serve as a central repository for any information associated with any of the devices and information associated with the system 1400. Furthermore, the database 1455 may include a processor and memory or be connected to a processor and memory to perform the various operation associated with the database 1455. In certain embodiments, the database 1455 may be connected to the servers 1440, 1445, 1450, 1460, the first user device 1402, the second user device 1411, the additional user devices, any devices in the system 1400, any process of the system 1400, any program of the system 1400, any other device, any network, or any combination thereof.

The database 1455 may also store information and metadata obtained from the system 1400, store metadata and other information associated with the first and second users 1401, 1410, store communications traversing the system 1400, store user preferences, store information associated with any device or signal in the system 1400, store information relating to patterns of usage relating to the user devices 1402, 1411, store any information obtained from any of the networks in the system 1400, store historical data associated with the first and second users 1401, 1410, store device characteristics, store information relating to any devices associated with the first and second users 1401, 1410, store information associated with the communications network 1435, store any information generated and/or processed by the system 1400, store any of the information disclosed for any of the operations and functions disclosed for the system 1400 herewith, store any information traversing the system 1400, or any combination thereof. Furthermore, the database 1455 may be configured to process queries sent to it by any device in the system 1400.

Notably, as shown in FIG. 11, the system 1400 may perform any of the operative functions disclosed herein by utilizing the processing capabilities of server 1460, the storage capacity of the database 1455, or any other component of the system 1400 to perform the operative functions disclosed herein. The server 1460 may include one or more processors 1462 that may be configured to process any of the various functions of the system 1400. The processors 1462 may be software, hardware, or a combination of hardware and software. Additionally, the server 1460 may also include a memory 1461, which stores instructions that the processors 1462 may execute to perform various operations of the system 1400. For example, the server 1460 may assist in processing loads handled by the various devices in the system 1400, such as, but not limited to, monitoring a state of a mesh network including any number of communication cubes; monitoring the connections between communication cubes and/or other devices in the mesh network; updating routing tables indicating connection changes of the mesh network; determining that status of each communication (and/or node) in the mesh network; determining radio signal strength to a communication cube (and/or node) from a device of interest; determining data rates associated with the mesh network; determining error rates associated with the mesh network; monitoring wired connections in addition to wireless connections of the network; selecting the best performing path via the mesh network to send data to a destination; determining alternate routes within the mesh network in the event a cube and/or node fails in the mesh network; performing monitoring at selected time intervals; probing connections that each communication cube locates; building a network of connections based on MAC addresses associated with the connections; testing the speed of detected connections; testing the data rate of the mesh network; determining an accuracy of data transmitted; building tables with data on detected cubes and/or nodes; transmitting the table and/or information to a subset or all of the mesh network; building a routing table that prioritizes the fastest data for the best path to each node/cube; and performing any other suitable operations conducted in the system 100 or otherwise. In one embodiment, multiple servers 1460 may be utilized to process the functions of the system 1400. The server 1460 and other devices in the system 100, may utilize the database 1455 for storing data about the devices in the system 1400 or any other information that is associated with the system 1400. In one embodiment, multiple databases 1455 may be utilized to store data in the system 1400.

Figure 12:
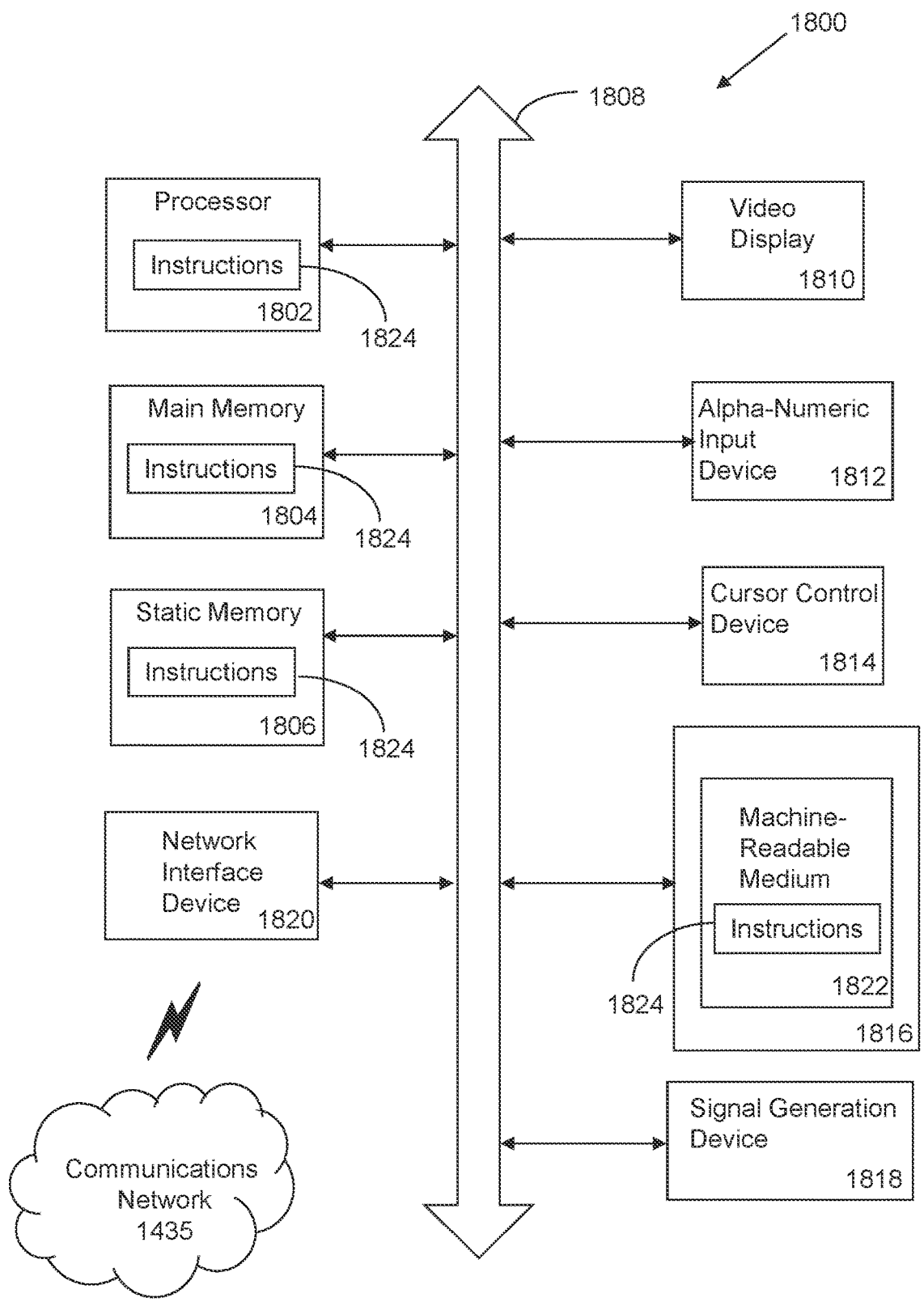
FIG. 12 is a schematic diagram of a machine in the form of a computer system within which a set of instructions, when executed, may cause the machine to facilitate self-healing of a network.

Although FIGS. 6, 11, and 12 illustrate specific example configurations of the various components of the system 1400, the system 1400 may include any configuration of the components, which may include using a greater or lesser number of the components. For example, the system 1400 is illustratively shown as including a first user device 1402, a second user device 1411, a communications network 1435, a server 1440, a server 1445, a server 1450, a server 1460, and a database 1455. However, the system 1400 may include multiple first user devices 1402, multiple second user devices 1411, multiple communications networks 1435, multiple servers 1440, multiple servers 1445, multiple servers 1450, multiple servers 1460, multiple databases 1455, or any number of any of the other components inside or outside the system 1400. Furthermore, in certain embodiments, substantial portions of the functionality and operations of the system 1400 may be performed by other networks and systems that may be connected to system 1400.

Notably, the system 1400 may execute and/or conduct the functionality as described in the method(s) disclosed herein above.

Referring now also to FIG. 12, at least a portion of the methodologies and techniques described with respect to the exemplary embodiments of the system 1800 can incorporate a machine, such as, but not limited to, computer system 1800, or other computing device within which a set of instructions, when executed, may cause the machine to perform any one or more of the methodologies or functions discussed above. The machine may be configured to facilitate various operations conducted by the system 1400. For example, the machine may be configured to, but is not limited to, assist the system 1400 by providing processing power to assist with processing loads experienced in the system 1400, by providing storage capacity for storing instructions or data traversing the system 1400, or by assisting with any other operations conducted by or within the system 1400. As another example, the computer system 1800 may assist with monitoring a mesh network of the system and/or communication cubes of the system.

In some embodiments, the machine may operate as a standalone device. In some embodiments, the machine may be connected (e.g., using communications network 1435, another network, or a combination thereof) to and assist with operations performed by other machines and systems, such as, but not limited to, the first user device 1402, the second user device 1411, the server 1440, the server 1445, the server 1450, the database 1455, the server 1460, any other system, program, and/or device, or any combination thereof. The machine may be connected with any component in the system 1400. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1800 may include a processor 1802 (e.g., a central processing unit (CPU), a graphics processing unit (GPU, or both), a main memory 1804 and a static memory 1806, which communicate with each other via a bus 1808. The computer system 1800 may further include a video display unit 1810, which may be, but is not limited to, a liquid crystal display (LCD), a flat panel, a solid state display, or a cathode ray tube (CRT). The computer system 1800 may include an input device 1812, such as, but not limited to, a keyboard, a cursor control device 1814, such as, but not limited to, a mouse, a disk drive unit 1816, a signal generation device 1818, such as, but not limited to, a speaker or remote control, and a network interface device 1820.

The disk drive unit 1816 may include a machine-readable medium 1822 on which is stored one or more sets of instructions 1824, such as, but not limited to, software embodying any one or more of the methodologies or functions described herein, including those methods illustrated above. The instructions 1824 may also reside, completely or at least partially, within the main memory 1804, the static memory 1806, or within the processor 1802, or a combination thereof, during execution thereof by the computer system 1800. The main memory 1804 and the processor 1802 also may constitute machine-readable media.

Routine Data Over Medium and High Voltage Power Lines

In embodiments, any of the communication cubes disclosed herein above, including any of the apparatus shown in FIGS. 1-3, may be adapted to provide communication over power lines that carry voltages greater than the 120 volt or 240 volt power typically found in households and offices. These include what are known as medium and/or high voltage power lines. High voltage power lines refer to those types of power lines that are commonly used to transmit power from large scale power plants to cities, and typically carry about 100,000 to about 200,000 volts or higher. Medium voltage power lines refer to those types of power lines that are commonly used to transmit power between sub-stations in different cities, and typically carry about 1,000 volts to about 69,000 volts or higher.

When electrical power is transported over long distances, it is commonly transported at such high voltages to reduce the resistance of the physical medium (i.e., the wires). It is stepped down by a transformer to a lower, more useful voltage for local distribution. For instance, power may be transported from a power plant to a city at 100,000 to 200,000 volts over hundreds of miles with relatively little loss. Transformer stations in the city may step that voltage down by about an order of magnitude to transmit to other substations in the same or nearby cities. Other transformer stations in the city may step down the voltage to lower levels for transport within the city, and then yet other transformer stations will step the voltage down further for distribution into households, offices, etc.

Typically, electrical power is transmitted as an alternating current (AC) at a relatively low frequency. For instance, in the United States, almost all electrical power, including, high voltage transmission lines, medium voltage transmission lines, and local transmission lines, carry AC current at 60 Hz. Transformers are electrical devices that take an input current at one voltage and output a current at a different voltage. A step-down transformer takes an input current at a relatively higher voltage and outputs an output current at a relatively lower voltage. A step-up transformer takes an input current at a relatively lower voltage and outputs an output current at a relatively higher voltage. A transformer essentially comprises two inductor coils of different sizes positioned adjacent to each other with a generally nonconductive medium (e.g., air) between them. Generally, inductors are poor transmitters of high frequency electrical signals, but are excellent transmitters of low frequency electrical signals (where direct current (DC) essentially may be considered zero frequency current). In power distribution, most transformers are step-down transformers since, in power transmission, voltage is almost always stepped down incrementally from the power plant to a city substation, to a more local substation, and ultimately to a final destination, such as a household, hospital, office, manufacturing plant, etc. Since most power distribution systems in the world transmit power at about 50 Hz or 60 Hz, transformers used in power distribution are generally designed to pass current at frequencies up to at least 60 Hz. However, such transformers generally cannot pass through electrical signals at frequencies much higher than that, such as the frequencies at which data is typically transmitted. For instance, currently, Wi-Fi signals are generally modulated at approximately either 2.4 GHz or 5 GHz. (It will be understood by those of skill in the related arts that, although the term frequency is used in this discussion, any given Wi-Fi or other radio transmission typically consumes a frequency range, rather than one specific frequency, and, thus, the term frequency should be understood as including frequency ranges). Hence, generally, data at any reasonable frequency at which data might typically be transmitted (e.g., at least 1 KHz) cannot pass through a power line transformer. Thus, data transmitted on a power line at higher frequencies cannot make it through a transformer station.

In accordance with an embodiment, in order to transmit data over power lines that include high voltage and medium voltage transformers, provision is made to intercept the data on the power line on the upstream side of any transformer and place it back on the power line on the downstream side of the transformer.

Figure 13A:
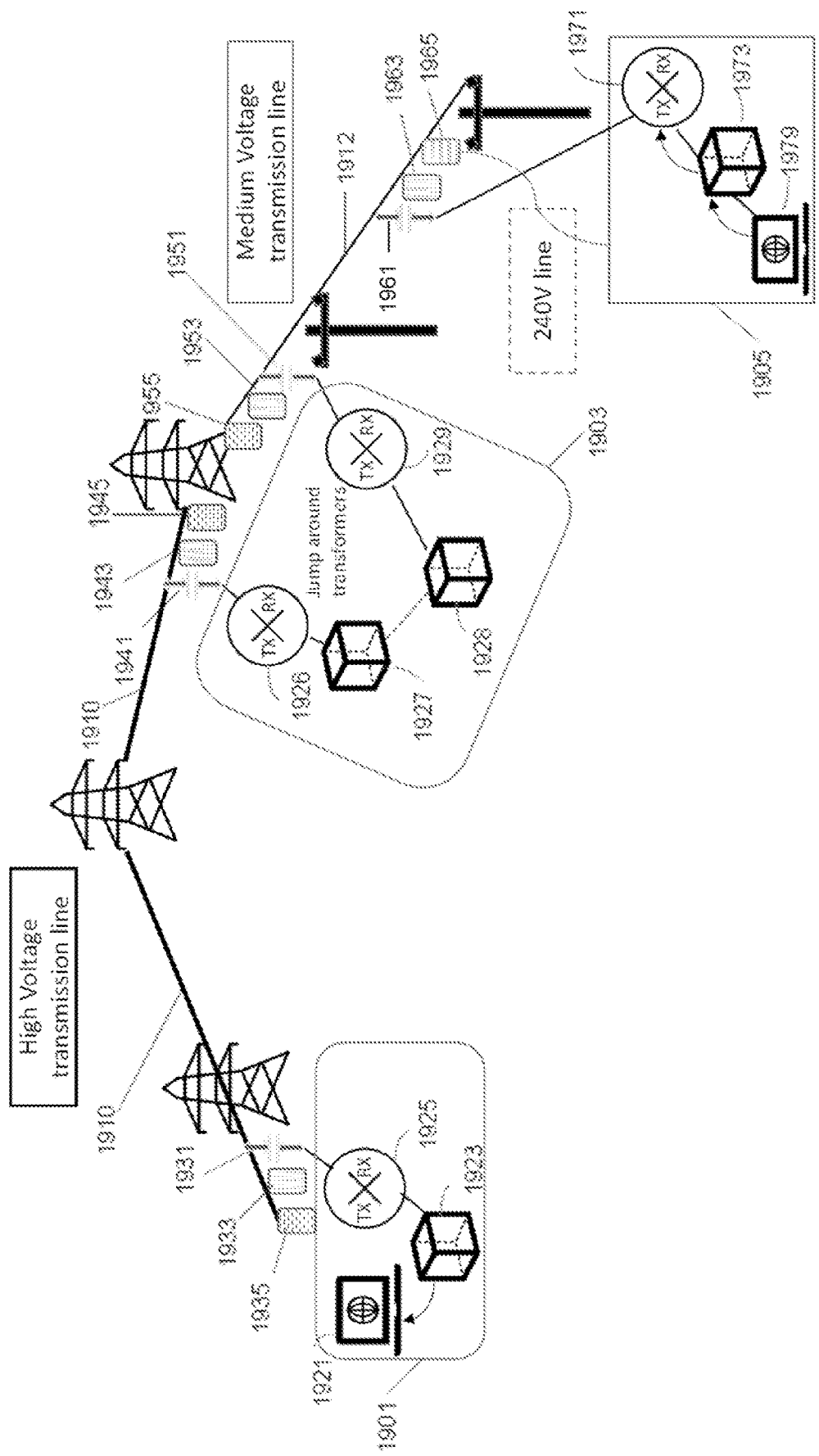
FIG. 13A is a block diagram illustrating a system for transmitting data over medium and high voltage power lines in accordance with an embodiment.

FIG. 13A is a diagram illustrating a power distribution system comprising a 138 kilovolt (kV) high voltage line 1910 that runs between a power generation plant station 1901 and a substation 1903 in a nearby city (e.g., 60 miles away). For purposes of this discussion a substation may be considered to be a node of the power distribution system at which electrical current may be tapped off and distributed to one or more other nodes, such as other stations or substations, and/or stepped up or down in voltage (using a transformer). A substation also is a location at which data signals may be placed onto the power transmission lines and/or at which data signals on the power line may be received. Of course, many other functions may be performed at a substation, such as monitoring of the power lines, etc.

Substation 1903 may tap off and step down some of the power for further distribution within the city. FIG. 13A shows one such tap, namely, a 13.8 kV line 1912 to another substation 1905 that is, e.g., 3 miles away from substation 1903. Typically, there may be several other taps to other substations, etc., but FIG. 13A show only one other substation and transmission line (1905, 1912, respectively) in order not to obfuscate the drawing.

A computing device, such as a personal computer (PC) 1921 is located at power station 1901 and it is desired to place data from PC 1921 onto the high voltage power line 1910 for transmission to substation 1905 via substation 1903. According to an embodiment, the PC is coupled to a network node 1923, such as any of the aforementioned communication cubes of FIGS. 1-3. In addition to the components illustrated in any of FIGS. 1-3, network node 1923 further includes a separate port and interface for coupling to a high voltage line, such as line 1910.

Figure 13B:
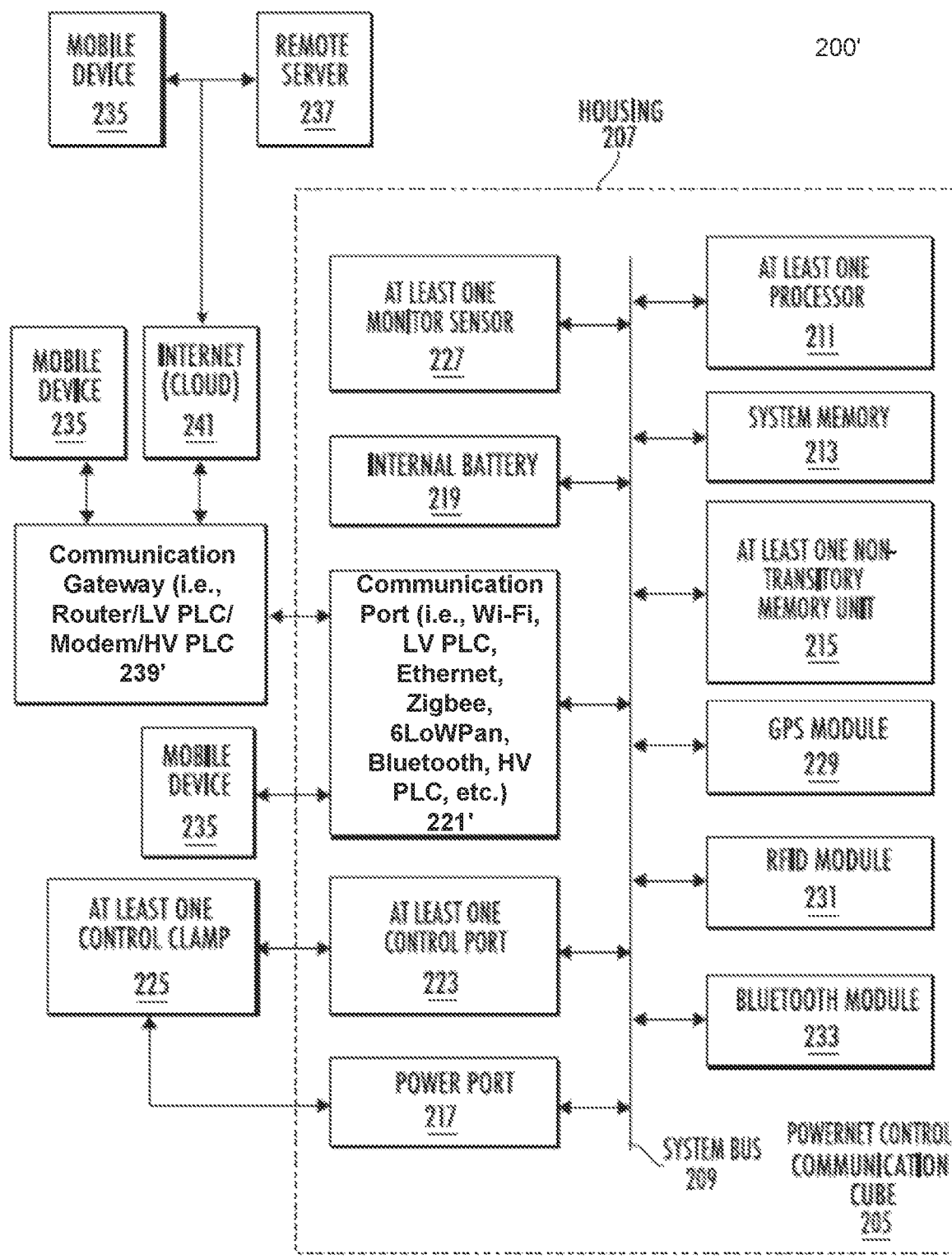
FIG. 13B is a block diagram illustrating an apparatus for monitoring, controlling, and communicating in accordance with embodiments for medium and high voltage line applications.

Using the communication cube 200 of FIG. 2 as an example, FIG. 13B shows a modified communication cube 200' in accordance with the present embodiment. Only blocks 221 and 239 are modified relative to the device illustrated by FIG. 2. Particularly, an additional communication port for high voltage (HV) PLC is added to communication port block 221 and a corresponding gateway for high voltage (HV) power line is added to communication gateway block 239. The HV PLC communication port and the HV gateway may be identical to the original PLC communication port and gateway from FIG. 2, respectively (labelled as low voltage PLC communication port and low voltage gateway in FIG. 13B in order to distinguish from the high voltage communication port and gateway, respectively). Similar modifications may be implemented in the communication cubes of FIGS. 1 and 3 to adapt them in the same manner.

Returning to FIG. 13A, data may be coupled from PC 1921 onto power line 1910 by transmitting the data from the PC 1921 to the network node 1923. Network node 1923 then forwards the data to a power line communication module (PLCM) 1925. PLCM 1925 is a transceiver for placing the data signals onto the power line (and/or receiving data signals from the power line). For purposes of the present discussion, it is being used as a transmitter and will be discussed as such. It may be a radio transmitter with the antenna output port connected to the power line (through a coupling capacitor voltage transformer (CCVT) as discussed below) instead of an antenna insofar as the power line will accept the data signals just as well as an antenna. The data signals will travel down the power line rather than through the air with no or minimal actual wireless signal radiation from the power line to the air. The transmitter 1925 may, for instance, comprise a 100 watt high frequency transceiver. PLCM 1925 couples to the high voltage power line 1910 through a CCVT 1931. A CCVT is commonly used in power transmission for coupling data onto a power line. It has a capacitance that is high enough that it cannot pass electrical signals at low frequency, e.g., the 60 Hz frequency of the power on the high voltage power line, but can pass signals of higher frequency, e.g., the data signals from PC 1921 and network node 1923. Accordingly, CCVT 1931 acts as a filter that passes the data signals from PLCM 1925 onto the high voltage power line 1910, but prevents any of the high voltage signal on line 1910 from feeding into the PLCM 1925, network node 1923, or PC 1921, which components are not capable of handling high voltages and would be damaged by such high voltage signals.

In addition, a wave trap 1933 is located on the power line upstream of the CCVT, wherein upstream in this context means in the direction opposite the direction in which the data signals are desired to travel and downstream means in the direction in which the data signals are desired to travel. A wave trap is a resonant circuit that prevents the higher frequency data signal from passing through it by presenting a high reactance to it. However, it allows the power signal, which is at a much lower frequency (e.g., 60 Hz) through by presenting a low reactance to low frequency signals. The wave trap causes substantially all of the energy of the data signal to travel only in the desired direction on the power line (i.e., toward substation 1905) while allowing the power signal to pass through it substantially unimpeded. In the absence of the wave trap 1933, half of the energy of the data signal would travel in the opposite direction on the high voltage power line and be wasted energy. Thus, most of the power of the data signal travels toward destination substation 1905, rather than merely half of it.

In addition, a high voltage transformer 1935 likely would be present at the power station for transforming the high voltage on the power line 1910 to another voltage for purposes related to power transmission and use at the station. Since, as previously described, the data cannot pass through the high voltage transformer because the inductive values of transformers commonly used on power lines will filter out any portion of the frequency above a relatively low cut-off frequency threshold (usually anything above about 100 Hz), the CCVT 1931 and wave trap 1933 should be positioned on the downstream side of the transformer 1935.

Since the data signal cannot pass through a high or medium voltage transformer, at substation 1903, another CCVT 1941 is coupled to the power line 1910 before any transformer at that location. As previously discussed, CCVT 1941 allows the data signal to pass through, but blocks the lower frequency (e.g., 60 Hz) high voltage power from passing through, thereby protecting the equipment on the other side of the CCVT from the high voltage on the power line 1910. Thus, the data is extracted from the power line 1910 by CCVT 1941 and passed to a receiver 1926. Again, receiver 1926 may be a transceiver like transceiver 1925 in power station 1902, but is being used as a receiver in this instant. Receiver 1926 forwards the data to a network node 1927, which may be identical to previously-described network node 1923.

Meanwhile, the high voltage, low frequency power signal continues down the power line 1910 through another wave trap 1943 (which blocks any remaining energy of the high frequency data signal from passing through). On the other side of the wave trap, the power signal may be tapped off by one or more transformers 1945, 1955 for use in lower voltage power transmission and usage purposes. For instance, transformer 1945 may step down the voltage to 4 kV for local distribution in the city (not shown). Similarly, transformer 1955 also may receive the original power signal at 138 kV and step it down by a factor of ten to 13.8 kV for transmission over a medium voltage power line 1912 to substation 1905.

As previously mentioned, the data that was placed on the high voltage power line 1910 is intended for substation 1905, not this substation 1903. Accordingly, the data is not processed or otherwise used at substation 1903, but rather needs to be placed back on power line 1910 downstream of the transformers 1945 and 1955 for further transmission down to substation 1905. Accordingly, network node 1927 transmits the data to another network node 1928 (e.g., via a local communication network of which nodes 1927 and 1928 are a part). Network node 1928 forwards the data to a PLCM 1929, which may be identical in all practical respects to PLCM 1925 in power station 1901.

PLCM sends the signal to another CCVT 1951 to couple the data onto power line 1912. Again, a wave trap 1953 is positioned on the power line 1912 on the upstream side of the CCVT. Furthermore, for the same reasons discussed in connection with station 1901, the wave trap 1953 and CCVT 1951 are positioned on the downstream side of the high (or medium) power transformer 1955.

Accordingly, the data has passed through substation 1903 without being lost in the high voltage transformers, e.g., 1945, 1955.

The data signal and the power signal travel down power line 1912 to substation 1905, where they encounter, in order, another CCVT 1961, another wave trap 1963 and another transformer 1965. Consistent with earlier discussion, CCVT 1961 extracts the data signal from the power line 1912 and lets the medium voltage power signal pass through down the power line through wave trap 1963 and to power transformer 1965. Power transformer steps down the voltage from 13.8 kV to, for instance, 240 volts for use in powering equipment at substation 1905.

Meanwhile the data signal is passed from CCVT to another receiver 1971, which may be similar to receiver 1926 in substation 1903. Receiver 1971 passes the data to network node 1973, which may be similar to aforementioned network nodes 1923, 1927, and 1928. Since substation 1905 is the desired destination for the data, network node 1973 forwards the data to another computing device at substation 1905, such as another PC 1979.

Thus, the data generated at station 1901 has traveled through high and medium voltage power lines 1910 and 1912 and through an intermediate substation 1903 intact for use at substation 1905 and with no disruption to the power transmission down those lines.

Although not specifically discussed above, it should be understood that data also may be transmitted in the other direction between any of stations/substations 1901, 1903, and 1905. In particular, for instance, wave traps 1943 and 1963 do not serve a significant function in the above-described example in which the data signal that is being transmitted in the left to right direction in FIG. 13A (from station 1901 to substation 1905 through substation 1903) because most, if not all, of the energy of the data signal has already been extracted from the power line before it reaches those wave traps. However, if data were being transmitted in the opposite direction (e.g., from substation 1905 to station 1901 through substation 1903), then wave traps 1943 and 1963 would serve the significant function of directing all of the data signal energy in the proper direction (but wave traps 1953 and 1933 would not be serving a significant function in that scenario since most, if not all, of the data signal energy has already been removed from the line before reaching the wave traps 1953 and 1933).

CONCLUSION

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1822 containing instructions 1824 so that a device connected to the communications network 1435, another network, or a combination thereof, can send or receive voice, video or data, and communicate over the communications network 1435, another network, or a combination thereof, using the instructions. The instructions 1824 may further be transmitted or received over the communications network 1435, another network, or a combination thereof, via the network interface device 1820.

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A method of receiving data over a power line, the method comprising:
   receiving a first combined signal from the power line at a first location on the power line, the first combined signal comprising a power signal in a first frequency range and a data signal modulated in a second frequency range, the second frequency range being higher than the first frequency range;
   frequency filtering the first combined signal to pass signals above a threshold frequency and to not pass signals below the threshold frequency, wherein the threshold frequency is higher than the first frequency and lower than the second frequency in a manner that the data signal is passed and the power signal is filtered out;
   demodulating the first data signal to produce a demodulated data signal; and
   transmitting the demodulated data signal to a local network.

2. The method of claim 1, wherein the first location on the power line is upstream of a voltage transformer, coupled to the power line, configured to transform a voltage of the power signal.

3. The method of claim 1, wherein the first frequency range is about 50 Hz to 60 Hz and the second frequency is at least 1 KHz.

4. The method of claim 1, wherein the power signal is greater than 100.00 volts.

5. The method of claim 1, wherein the power signal is greater than 1000 volts.

6. An apparatus for coupling data onto a power line, the apparatus comprising;
   a transmitter having an input terminal for receiving a data signal and an output terminal for transmitting the data signal received at the input terminal onto the power line; and
   a first coupling capacitor voltage transformer (CCVT) coupled between the transmitter and the power line, the first CCVT configured to pass signals above a threshold frequency and to not pass signals below the threshold frequency;
   wherein the output terminal of the first CCVT is coupled to the power line at a first location upstream of a power voltage transformer coupled to the power line for transforming a voltage of the power signal.

7. The apparatus of claim 6, wherein the power line bears a power signal in a first frequency range below the threshold frequency and the data signal comprises a second frequency range higher than the threshold frequency.

8. The apparatus of claim 7, wherein the first frequency range is no greater than 60 Hz and the second frequency is at least 1 KHz.

9. The apparatus of claim 6, wherein the transmitter is a power line communication module (PLCM).

10. The apparatus of claim 6, further comprising:
a first wave trap coupled to the power line between the first CCVT and the power voltage transformer.

11. The apparatus of claim 6, wherein the transmitter is a transceiver.

12. A method of transmitting data over a power line, the method comprising:
coupling a data signal onto the power line at a first location, the power line bearing a power signal in a first frequency range, and wherein the data signal comprises a second frequency range higher than the first frequency; and
trapping signals in the second frequency range at a location on the power line upstream of the first location relative to an intended destination of the data signal.

13. The method of claim 12, wherein the first location is downstream of a power voltage transformer on the power line.

14. The method of claim 12, wherein the power signal is greater than 100.00 volts.

15. The method of claim 12, wherein the power signal is greater than 1000 volts.

\* \* \* \* \*